(12) United States Patent
Chandler

(10) Patent No.: US 12,180,690 B1
(45) Date of Patent: Dec. 31, 2024

(54) BACKFLOW PREVENTER

(71) Applicant: Vista Water Group, LLC, Ashland, OH (US)

(72) Inventor: James W. Chandler, Ashland, OH (US)

(73) Assignee: VISTA WATER GROUP, LLC, Ashland, OH (US)

( * ) Notice: Subject to any disclaimer, the term of this patent is extended or adjusted under 35 U.S.C. 154(b) by 209 days.

(21) Appl. No.: 17/517,245

(22) Filed: Nov. 2, 2021

Related U.S. Application Data

(60) Provisional application No. 63/110,115, filed on Nov. 5, 2020.

(51) Int. Cl.
| | | |
|---|---|---|
| *E03B 7/07* | (2006.01) | |
| *F16K 11/20* | (2006.01) | |
| *F16K 27/02* | (2006.01) | |
| *G01L 19/00* | (2006.01) | |
| *G01L 19/10* | (2006.01) | |

(52) U.S. Cl.
CPC .............. *E03B 7/077* (2013.01); *F16K 11/20* (2013.01); *F16K 27/0209* (2013.01); *G01L 19/0007* (2013.01); *G01L 19/10* (2013.01)

(58) Field of Classification Search
CPC .... Y10T 137/7838; E03B 7/077; F16K 11/20; F16K 27/0209; G01L 19/0007; G01L 19/10
See application file for complete search history.

(56) References Cited

U.S. PATENT DOCUMENTS

| | | | | |
|---|---|---|---|---|
| 5,148,828 A | * | 9/1992 | Farnham | F16K 15/066 137/542 |
| 6,668,858 B1 | * | 12/2003 | Bazargan | F16K 15/033 251/86 |
| 7,784,483 B2 | * | 8/2010 | Grable | E03B 7/077 137/315.33 |
| 2001/0015419 A1 | * | 8/2001 | Yagi | F16K 1/308 251/151 |
| 2003/0089403 A1 | * | 5/2003 | Duncan | E03B 7/077 137/512 |
| 2004/0035467 A1 | * | 2/2004 | Hecking | E03C 1/108 137/512 |
| 2007/0042697 A1 | * | 2/2007 | Stout | B64D 13/02 454/74 |
| 2014/0196792 A1 | * | 7/2014 | Torres-Leon | A61M 39/223 137/1 |
| 2016/0177664 A1 | * | 6/2016 | Kelly | F16K 3/08 137/488 |
| 2017/0261124 A1 | * | 9/2017 | Delgado | F16K 15/03 |

\* cited by examiner

*Primary Examiner* — Jessica Cahill
(74) *Attorney, Agent, or Firm* — Ralph E. Jocke; WALKER & JOCKE

(57) ABSTRACT

A backflow preventer (10, 128) includes a body (12, 130). The body includes an inlet port (14, 132) and an outlet port (16, 134). A central cylindrical bore (26, 144) extends in the body and axially between the inlet port and the outlet port. A first check valve (40, 152) and a second check valve (42, 156) are removably mounted in the bore through an insertion opening (38, 150). A removable plug (94, 95, 158) is positionable in the insertion opening to hold the check valves within the bore. Some exemplary arrangements include a translucent body to facilitate visual observation of proper check valve operation and testing of the backflow preventer.

38 Claims, 19 Drawing Sheets

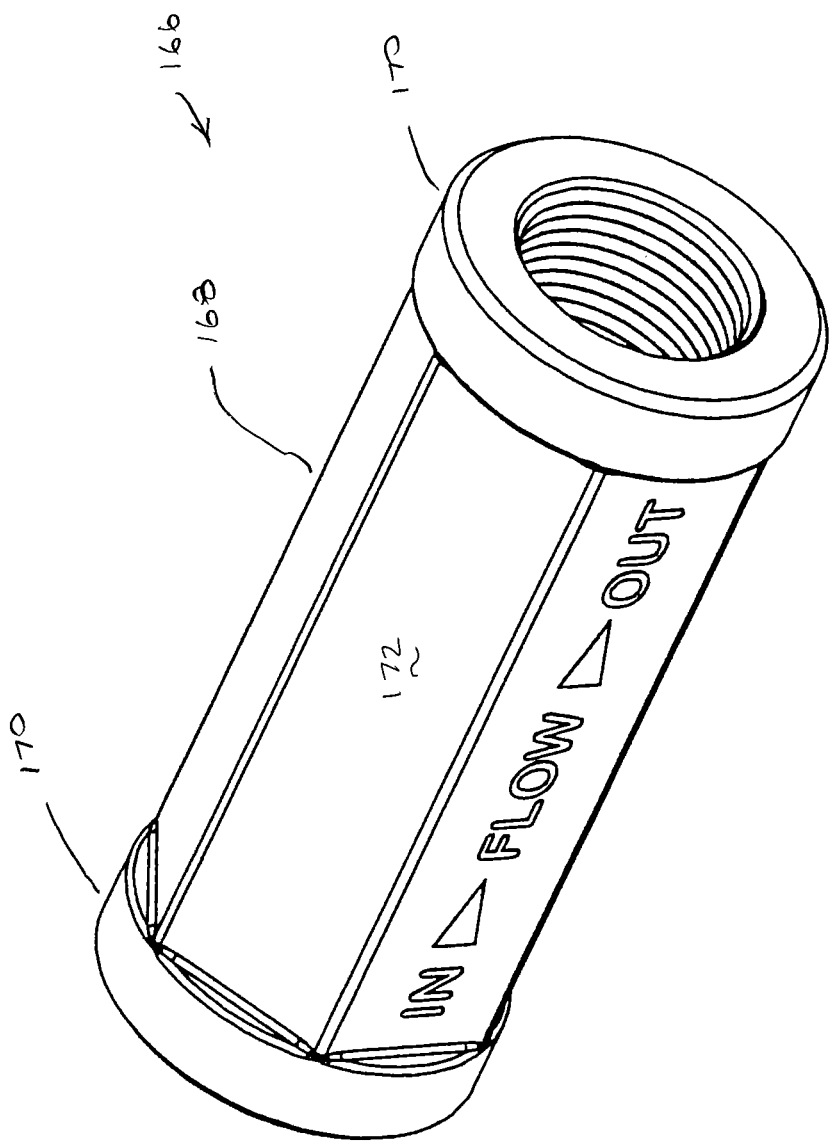

BACKFLOW PREVENTER

TECHNICAL FIELD

Exemplary arrangements relate to devices for controlling liquid flow. Specifically the exemplary arrangements relate to devices that enable liquid flow in a permitted flow direction while preventing flow in an opposed direction.

BACKGROUND

Backflow preventers are utilized in liquid flow systems where liquid is to be allowed to flow in only one direction and prevented from flowing in an opposed direction. Sometimes backflow preventers are used in water systems to assure that water can only flow in the desired direction. A backflow preventer operates to prevent any contaminants that may be present in the system into which the backflow preventer allows water to flow, from being drawn in the opposite direction and into a water supply line.

Backflow preventers may benefit from improvements.

SUMMARY

Exemplary arrangements include backflow preventers that operate reliably. Some exemplary arrangements include backflow preventers that enable visual observation from outside the body of the backflow preventer, of the positions of the check valve elements within the body that enable liquid flow in the desired direction and that prevent liquid flow in the opposed direction. Further exemplary arrangements enable the backflow preventer to be more readily tested and repaired. Further aspects of exemplary arrangements are explained in the following detailed description.

BRIEF DESCRIPTION OF DRAWINGS

FIG. 21 is a perspective view of a further alternative backflow preventer body.

DETAILED DESCRIPTION

Figure 1:
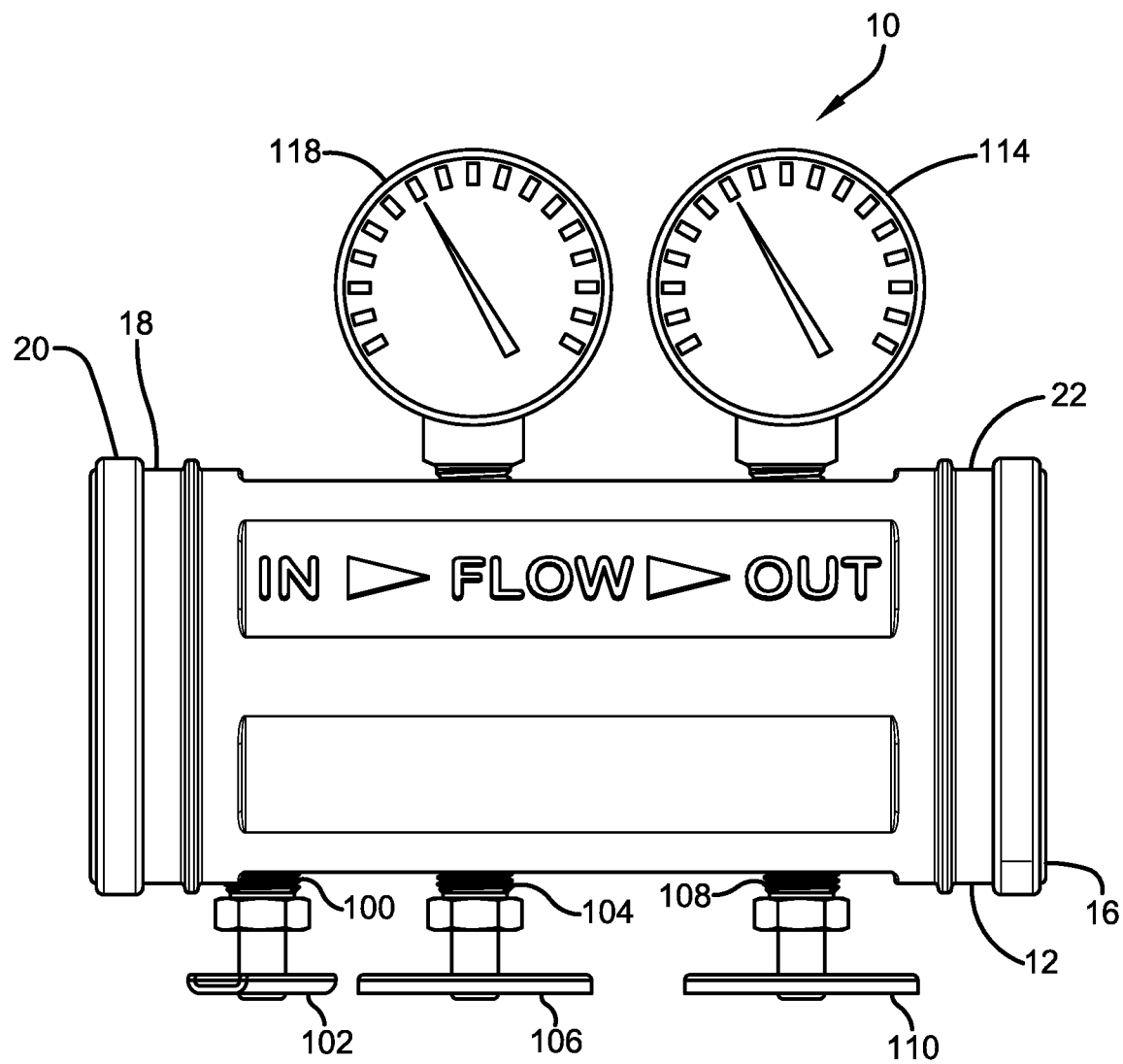
FIG. 1 shows a side view of an exemplary backflow preventer arrangement.

Referring now to the drawings and particularly to FIG. 1 there is shown therein an apparatus comprising backflow preventer generally indicated 10. Backflow preventer 10 includes a body 12. In the exemplary arrangements the body is comprised of a single piece of body material. In some exemplary arrangement the body is comprised of a single piece of plastic material. In some exemplary arrangements the body is comprised of a translucent plastic material. In some further exemplary arrangements the translucent character of the body material may be such that the material is near transparent or fully transparent. In some exemplary arrangements the body may be comprised of polyvinyl chloride (PVC), polycarbonate, polysulfone or other suitable plastic material. In other exemplary arrangements the body may be comprised of hard anodized aluminum. In other exemplary arrangements other materials and approaches may be used.

Figure 15:
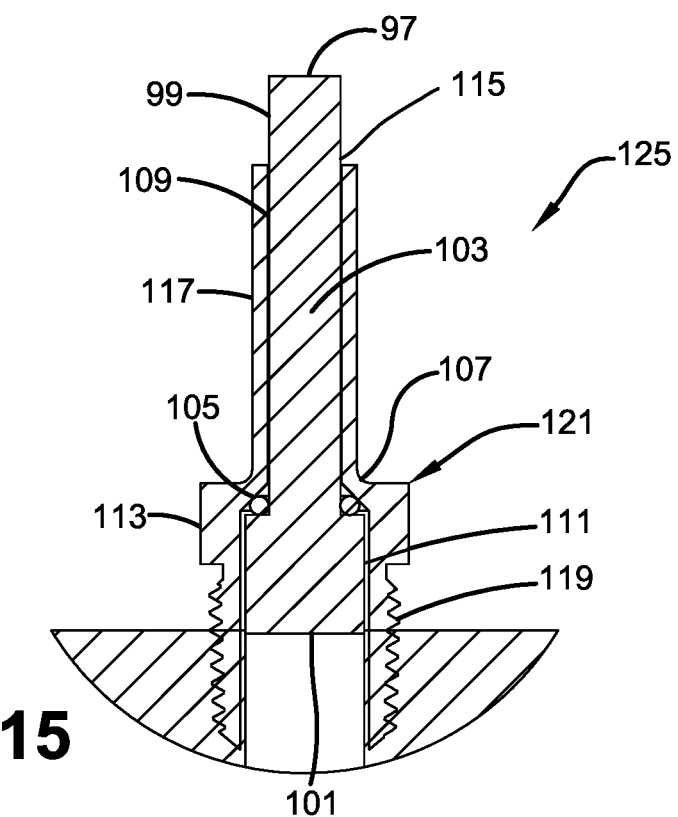
FIG. 15 is an enlarged cross-sectional view of a pressure indicator of the alternative arrangement shown in FIG. 12.

The exemplary body includes an inlet port 14 and an outlet port 16 at opposed ends of the body. As shown in FIG. 15 the exemplary inlet port 14 is a threaded port that extends in the body 12. Likewise the exemplary outlet port 16 is a threaded port that extends in the body. In an exemplary arrangement an annular inlet port overlying surface 18 extends radially outward of the inlet port in surrounding relation of the inlet port on the outer surface of the body. A continuous reinforcing ring 20 extends in surrounding relation of the inlet port overlying surface 18. In some exemplary arrangements the reinforcing ring 20 is comprised of a stronger material that is more resistant to deformation than the material of the body 12. In the exemplary arrangement in which the body is comprised of plastic material the reinforcing ring may be comprised of metallic material. In some exemplary arrangements the reinforcing ring may be comprised of stainless steel, for example.

The exemplary body 12 further includes an annular outlet port overlying surface 22. Surface 22 is radially disposed from the outlet port and extends in surrounding overlying relation of the outlet port 16. In the exemplary arrangement a reinforcing ring 24 extends in surrounding relation of the annular outlet port overlying surface. Reinforcing ring 24 of the exemplary arrangement is comprised of the same material as reinforcing ring 20. In exemplary arrangements the reinforcing rings 20, 24 provide additional strength that resists cracking of the body 12 in the event that fittings that are extended in the inlet port 14 or the outlet port 16 are over tightened. Of course this approach to reinforcing the body in the area of the inlet and outlet ports is exemplary and in other arrangements other approaches may be used, or no reinforcing rings may be used.

The exemplary body 12 includes a central cylindrical bore 26 and is bounded by a cylindrical wall. Bore 26 extends along an axis 28. A first axial end 30 of bore 28 extends adjacent to outlet port 16. Bore 26 is bounded at the first axial end 30 by a radially inward extending step surface 32. In the exemplary arrangement radially inward extending step surface 32 is an annular surface that extends in surrounding relation of an axially centered central bore access opening 34.

The exemplary bore further includes a second axial end 36 that is at an opposed axial end from the first axial end 30. A threaded insertion opening 38 extends within the body at the second axial end 36 of the bore. The exemplary insertion opening 38 is internally threaded and is of a smaller diameter than the threads of the inlet port 14.

A first check valve 40 and a second check valve 42 are positioned in the bore 26 in the operative configuration of the backflow preventer 10. The check valves 40 and 42 are arranged to enable flow in a first axial direction F. The check valves are configured to prevent flow in an opposed axial direction opposite to direction F. In the exemplary arrangement both the first check valve 40 and the second check valve 42 are the same. However in other exemplary arrangements check valves having different configurations may be used.

Figure 5:
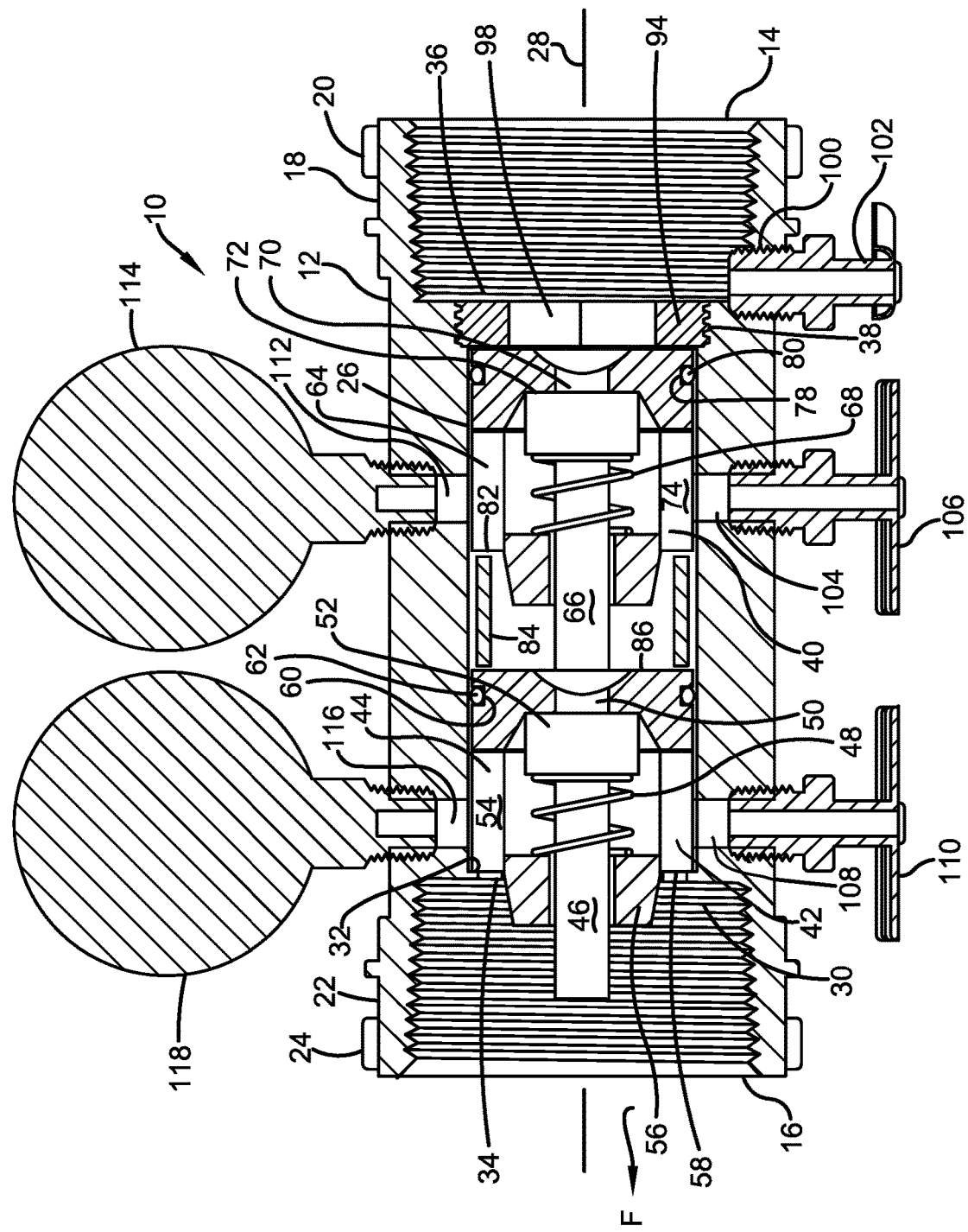
FIG. 5 shows a cross-sectional view of the backflow preventer taken along line 5-5 in FIG. 4, and showing the check valve elements in the closed positions.
Figure 6:
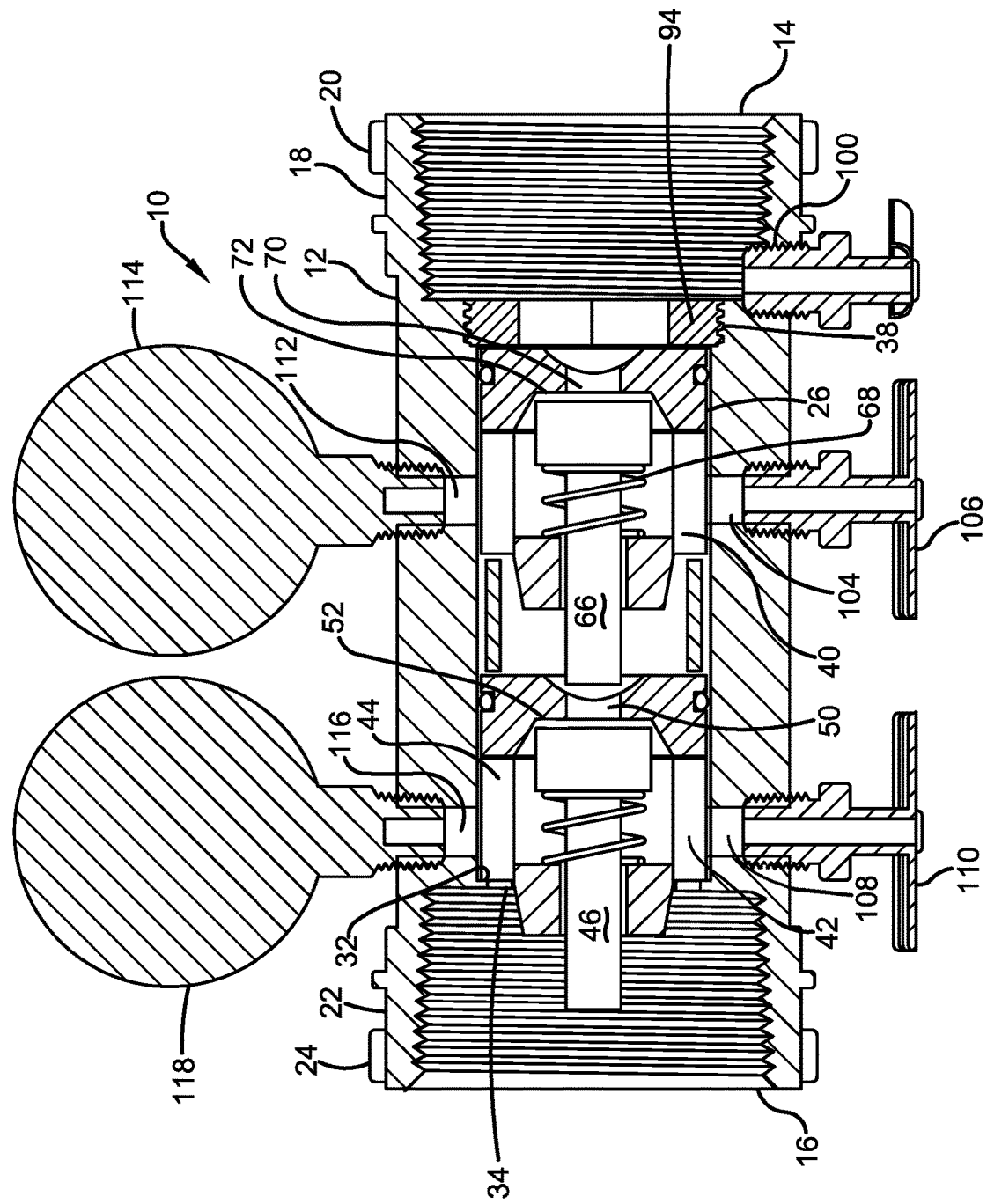
FIG. 6 is a cross-sectional view similar to FIG. 5 and showing the check valve elements in the open positions.

In the exemplary arrangement the second check valve 42 has a cylindrical body 44. When used herein to refer to the body of the check valve, cylindrical means having a profile that is generally cylindrical in shape and it is not required that the entire check valve body be a solid cylinder. A check valve element 46 is movably mounted on the cylindrical body 44. Check valve element 46 is movable along the axial direction between a check valve element closed position which is shown in FIG. 5, and a check valve element open position which is shown in FIG. 6. In the exemplary arrangement check valve element 46 is axially biased by a spring 48 toward the closed position.

The exemplary cylindrical body 44 includes an entry passage 50 that extends in axially centered relation of a planar circular seat 52. The spring 48 is operative to bias the cylindrical base of the check valve element 48 against the seat such that when the check valve element is in the check valve closed position, the seat provides the sealed location at which the check valve element prevents fluid flow through the central bore. The exemplary check valve 42 is operative such that liquid pressure that acts in the flow direction F through the entry passage 50 and against the adjacent face of the cylindrical base of the second check valve element 46, is operative at a set pressure level to displace the check valve element 46 from the check valve closed position shown in FIG. 5 to the check valve open position shown in FIG. 6.

In the exemplary arrangement the cylindrical body 44 includes a plurality of angularly spaced vanes 54. Vanes 54 are in attached connection with a central support portion 56. A stem of the valve element 46 extends through an opening in the support portion and is in movably mounted relation therewith.

In the exemplary arrangement each of the plurality of angularly spaced vanes 54 of the cylindrical body of check valve 42, include a respective radially extending back face 58. Each of the back faces 58 are in abutting relation with the radially inward extending step surface 32 which bounds the bore 26 at the first axial end. The abutting engagement of the back faces of the vanes 54 of the cylindrical body 44 with the step surface 32 is operative to hold the second check valve 42 in a fixed axial position in the bore 26. Of course it should be understood that this approach is exemplary and in other arrangements other structures may be utilized for purposes of maintaining the check valve body in the operative position within the bore. For example in some arrangements resilient structures such as a resilient washer or a coil spring may be axially disposed between the back face and the step so that the back face may be in operative connection with the step while enabling some axial movement to avoid damage that might be caused by dimensional differences or over tightening of the plug or other structures that hold the check valves in their operative positions.

In the exemplary arrangement the central support portion 56 extends in axially centered relation through the central bore access opening 34. Further a portion of the stem of the check valve element 46 also extends in the central bore access opening 34 in supported connection with the support portion 56. As can be appreciated from FIGS. 5 and 6 this enables the check valve 42 and the check valve element 46 to be externally accessed from outside the body 12 through the outlet port 16. This feature may be utilized in some arrangements to remove components within the bore for repair or replacement in a manner like that later discussed.

Further in the exemplary arrangement the cylindrical body 44 of check valve 42 includes an outer annular recess 60. A resilient circular seal 62 is positioned in the recess and extends between the outer annular surface of the cylindrical body 44 and the inner annular surface of the cylindrical bore 26. In the exemplary arrangement this feature seals the cylindrical body of second check valve 42 in operatively engaging fluid tight connection relative to the bore 26 and forces fluid to pass through the entry passage 50 of the check valve. This feature further assures that the backflow preventer operates to enable flow in the flow direction F and prevents flow in an opposed flow direction. Of course it should be understood that this sealing arrangement is exemplary and in other arrangements other approaches may be utilized.

In the exemplary arrangement the structure of first check valve 40 is the same as second check valve 44. First check valve 40 includes a cylindrical body 64. An axially movable check valve element 66 is movable between a first check valve element closed position as shown in FIG. 5 and a first check valve element open position shown in FIG. 6. Check valve element 66 is biased toward the first check valve closed position by a spring 68. Check valve 40 further includes an entry passage 70 that terminates at a generally circular planar seat 72. In the first check valve closed position the enlarged cylindrical base of the check valve element 66 is engaged with the seat 72 so that the area of engagement between the seat and the check valve element provides a first sealed location at which the first check valve element prevents fluid flow through the central bore 26.

Similar to second check valve 42, first check valve 40 includes a plurality of angularly spaced vanes 74. An axially centered support portion 76 is connected to the vanes and includes an opening therethrough in which a stem portion of the check valve element 66 is axially movable. Also similar to second check valve 42, the cylindrical body 64 includes an external annular recess 78 in which a resilient seal 80 is positioned. The resilient seal 80 of the exemplary arrangement causes the cylindrical body to be in fluid tight operative engagement with the cylindrical bore wall and prevents fluid from the inlet port from passing through the bore 26 other than through the entry passage 70 of the check valve 40. Of course it should be understood that this sealing arrangement is exemplary and other arrangements other sealing arrangements may be used.

In some arrangements where the body is comprised of translucent material the exemplary check valve elements 46, 66 have at least a portion thereof that have indicia thereon such as a coloration, that facilitates visual observation of whether the check valve element is in the check valve open position or the check valve closed position externally from the outside of the translucent body. In some exemplary arrangements the check valve elements may have one or more portions in a contrasting color to the color of material which comprises the cylindrical body of the check valve. This enables the user through a visual inspection to determine the axial position of the check valve element relative to the cylindrical body of the valve. This feature also enables the user to visually observe whether the check valve elements of each of the valves are moving axially in response to flow and are thereby operating properly. In other exemplary arrangements the configuration may be such that at least a portion of the check valve element is visible so that an external observer is enabled to view whether the check valve element is in one of either the open or closed positions. Of course it should be understood that various types of coloration or other types of indicia may be utilized for purposes of enabling an external observer to observe when the check valve element is in either the check valve open position and/or the check valve closed position. In exemplary arrangements the first and second check valves may be of a type manufactured by Neoperl GmbH of Mulheim, Germany. Of course it should be understood that this arrangement is exemplary and in other arrangements other check valve types and configurations may be used.

Figure 8:
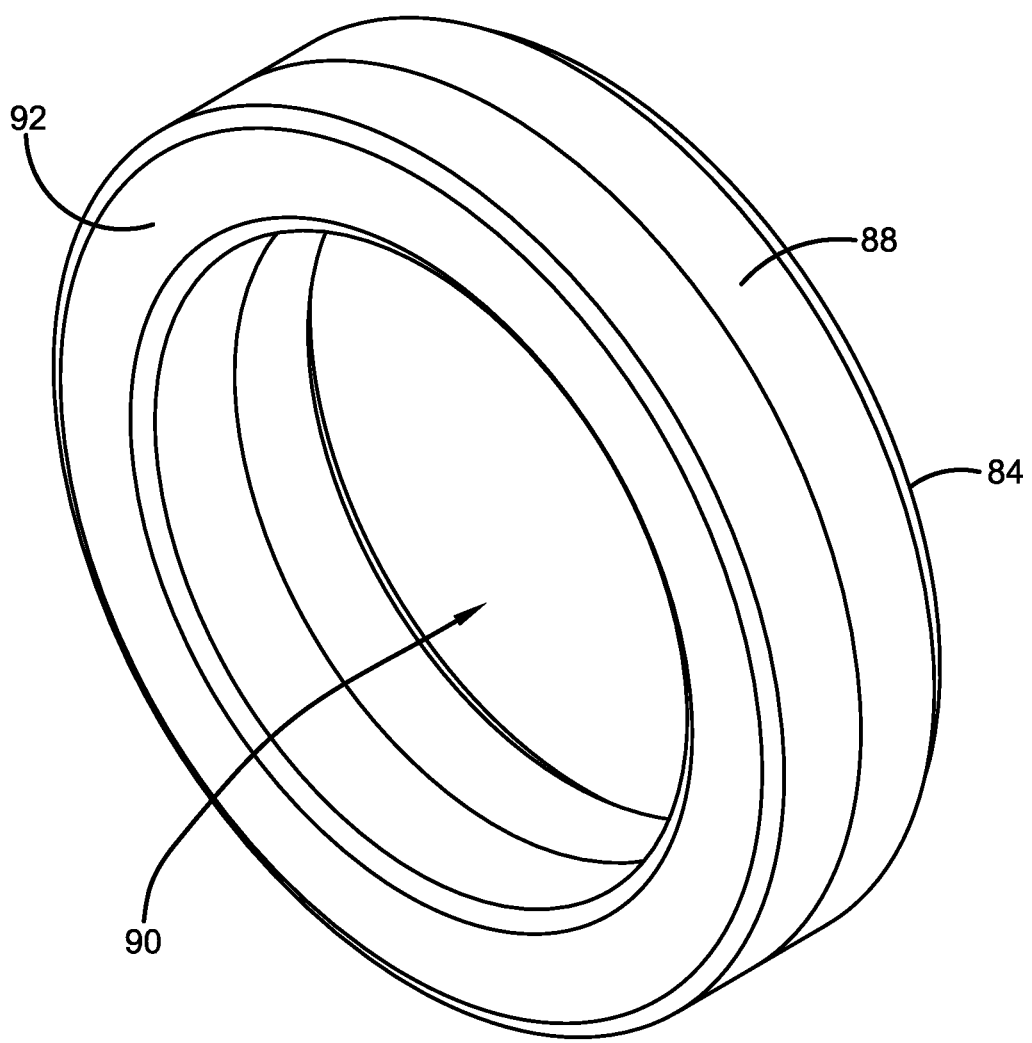
FIG. 8 is a perspective view of a spacer used in the exemplary arrangement.

In the exemplary arrangement the vanes 74 of the first check valve 40 include respective radially extending back faces 82. A cylindrical spacer 84 extends axially between the back faces 82 of the vanes 74 and a forward face 86 of the second check valve 42. As shown in FIG. 8 the exemplary spacer 84 includes an outer annular surface 88 that is sized to be axially positioned in the cylindrical bore 26. Spacer 84 further includes a central opening 90 that enables liquid to flow therethrough. Spacer 84 further includes a pair of opposed radially extending side faces 92. In the exemplary arrangement when each of the first check valve 40 and the second check valve 42 are in the operative position, each of the cylindrical bodies of the respective check valves are in abutting relation with the respective side faces 92 of the spacer 84. Of course it should be understood that this approach is exemplary and in other arrangement other approaches may be used. Further in other arrangements with different check valve configurations a spacer may be omitted.

Figure 9:
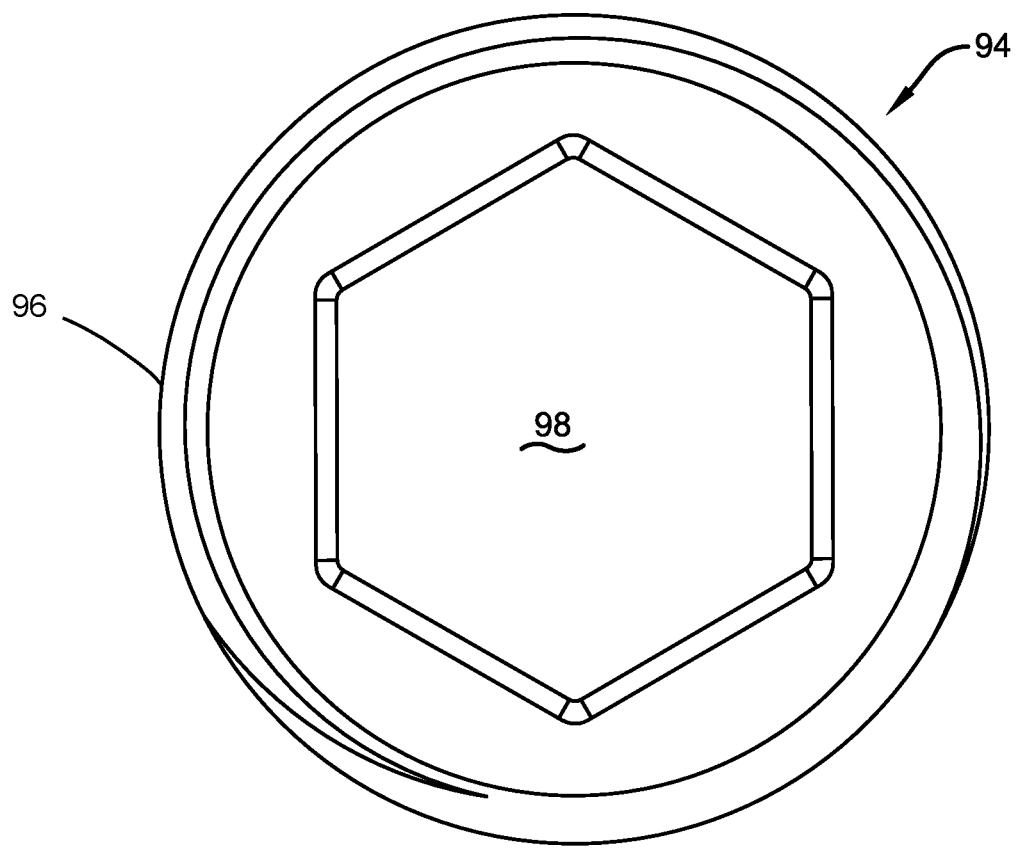
FIG. 9 is a front plan view of a plug used in an exemplary arrangement.
Figure 10:
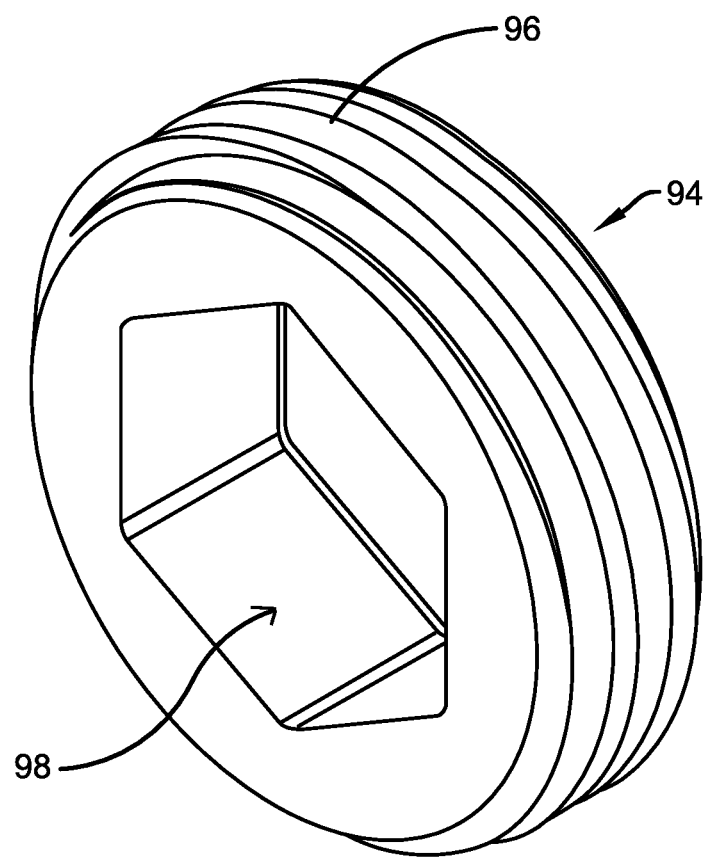
FIG. 10 is a perspective view of the plug.

The insertion opening 38 of the exemplary arrangement is configured to releasably receive a plug 94 therein. An exemplary plug 94 which is shown in FIGS. 9 and 10, is externally threaded. The external threads 96 of the plug 94 are configured to releasably engage with the internal threads of the insertion opening 38. The plug 94 is also sized so that it can be installed in the insertion opening 38 through the inlet port 14.

The exemplary plug 94 includes a central plug flow passage 98. The exemplary plug flow passage 98 is configured to enable liquid to flow therethrough into the entry passage 70 of the check valve 40 when the plug is installed in the insertion opening. The exemplary plug flow passage 98 is configured to accept and releasably engage a rotatable tool. In the exemplary arrangement the rotatable tool may include a hexagonal shape projection that can be extended into the plug flow passage 98. The tool may be rotated so as to engage and disengage the threads on the plug with the threads of the insertion opening. Of course it should be understood that this arrangement is exemplary and in other arrangements other holding structures may be used.

Figure 19:
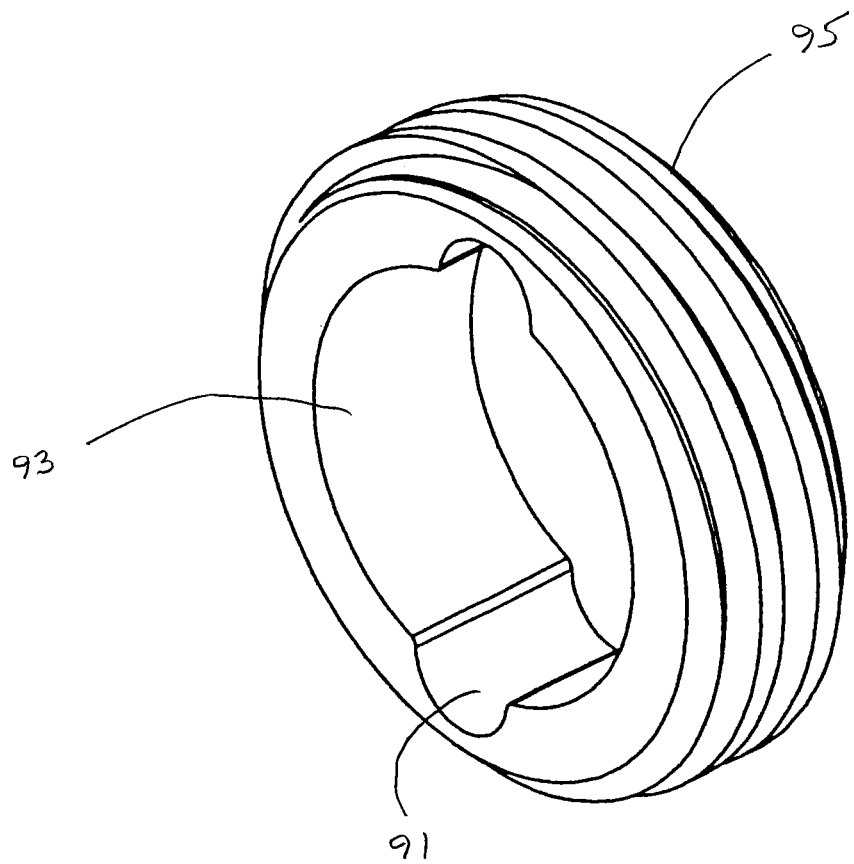
FIG. 19 is a perspective view of an alternative plug.

For example FIG. 19 shows an alternative plug 95. Plug 95 is similar to plug 94 but includes a flow passage 93. The exemplary plug flow passage 93 is generally circular but includes a pair of opposed radially outward extending recesses 91. The recesses 91 are configured to be engaged with a spanner tool, pliers or a similar tool that can be extended through the inlet opening to engage the recesses and rotate the plug. This alternative arrangement may be used to provide a relatively larger flow passage for a given plug diameter compared to openings having a hexagonal shape such as is shown in plug 94.

In some alternative arrangements the plug flow passage may have different configurations such as a square, star, octagon, rectangle, triangle, key projection or other shape that is suitable for enabling engagement with the tool that can be utilized for rotatably engaging and disengaging the plug and the insertion opening. Further it should be understood that while in the exemplary arrangement the plug includes a single central flow passage, in other arrangements the plug may include multiple flow passages through which the liquid can flow through the plug. For example other exemplary plugs may include a plurality of angularly spaced openings through which liquid can flow and which may be engaged by pins that extend on a tool that enables the plug to be installed in and removed from the insertion opening. Further other exemplary arrangements may include recesses, projections or other structures that are engageable on the plug and that are positioned away from the one or more openings. Such features may enable the plug to have the desired area for liquid flow therethrough. Further while in the exemplary arrangement the plug is shown in engagement with the insertion opening through a threaded engagement, in other arrangements different types of engagement structures may be utilized. These may include bayonet type locking engagements, external pin arrangements or other arrangements that hold the plug in a fixed axial position relative to the cylindrical bore. Of course it should be understood that these approaches are exemplary and in other arrangements other approaches may be used.

The exemplary backflow preventer 10 further includes a number of ports that facilitate testing the operation of the backflow preventer to assure that it is operating properly. In the exemplary arrangement the body 12 of the backflow preventer includes a first pressure relief port 100. The first pressure relief port 100 of the exemplary arrangement is in direct fluid connection with the inlet port 14. In the exemplary arrangement the first pressure relief port 100 is fluidly connected to a manually openable and closable valve 102. Valve 102 may be of the type that enables opening and closing the valve by rotating a pair of diametrically opposed projections that extend externally of the valve to move a valve element (not shown) between open and closed positions. Of course it should be understood that this configuration is exemplary and in other arrangements other types of valves and approaches may be used.

The exemplary backflow preventer 10 further includes a second pressure relief port 104. The second pressure relief port 104 is in direct fluid connection with the central bore 26 fluidly intermediate of the first sealed location at which the check valve element 66 engages the seat 72, and the second sealed location at which the check valve element 46 engages the seat 52. Second pressure relief port 104 is in fluid connection with a manually openable and closable valve 106. A third pressure relief port 108 is in direct fluid connection with the central bore 26 axially intermediate of the second sealed location at which the check valve element 46 engages the seat 52 and the radially inward extending step 32 which bounds the first axial end 30 of the bore 26. In other exemplary arrangements the third relief port may be in direct fluid connection with the outlet port in a manner similar to the first pressure relief port 100 and the inlet port. The third pressure relief port 108 is in operative connection with a manually openable and closable valve 110.

In the exemplary arrangement the body 26 further includes a first pressure indicating port 112. The exemplary first pressure indicating port is in direct fluid connection with the bore 26 between the first sealed location at seat 72 and the second sealed location at seat 52. First pressure indicating port 112 is fluidly connected to a first pressure indicator 114. In some exemplary arrangements the first pressure indicator may be a gage as shown. In other exemplary arrangements the first pressure indicator may include a plunger indicator or other type of indicator that includes a member that extends outwardly from a body to indicate the presence of pressure acting in the bore at the pressure indicating port. In still other exemplary arrangements the first pressure indicator may include an electronic sensor that is in operative connection with circuitry which provides output indicia or another indication of the pressure at the first pressure indicating port. Of course it should be understood that these approaches are exemplary and in other arrangements other approaches may be used.

The exemplary backflow preventer further includes a second pressure indicating port 116. The second pressure indicating port 116 is in direct fluid connection with the central bore 26 fluidly intermediate of the second sealed location at seat 52 and the radially inward extending step 32 at the first axial end 30 of the bore. In alternative arrangements the second pressure indicating port may be in direct fluid connection with the outlet port 16. The second pressure indicating port is fluidly connected to a second pressure indicator 118. The second pressure indicator 118 may be one of the types of pressure indicators previously discussed or may be of an alternative type. Of course these approaches are exemplary and in other arrangements other approaches may be used.

Figure 11:
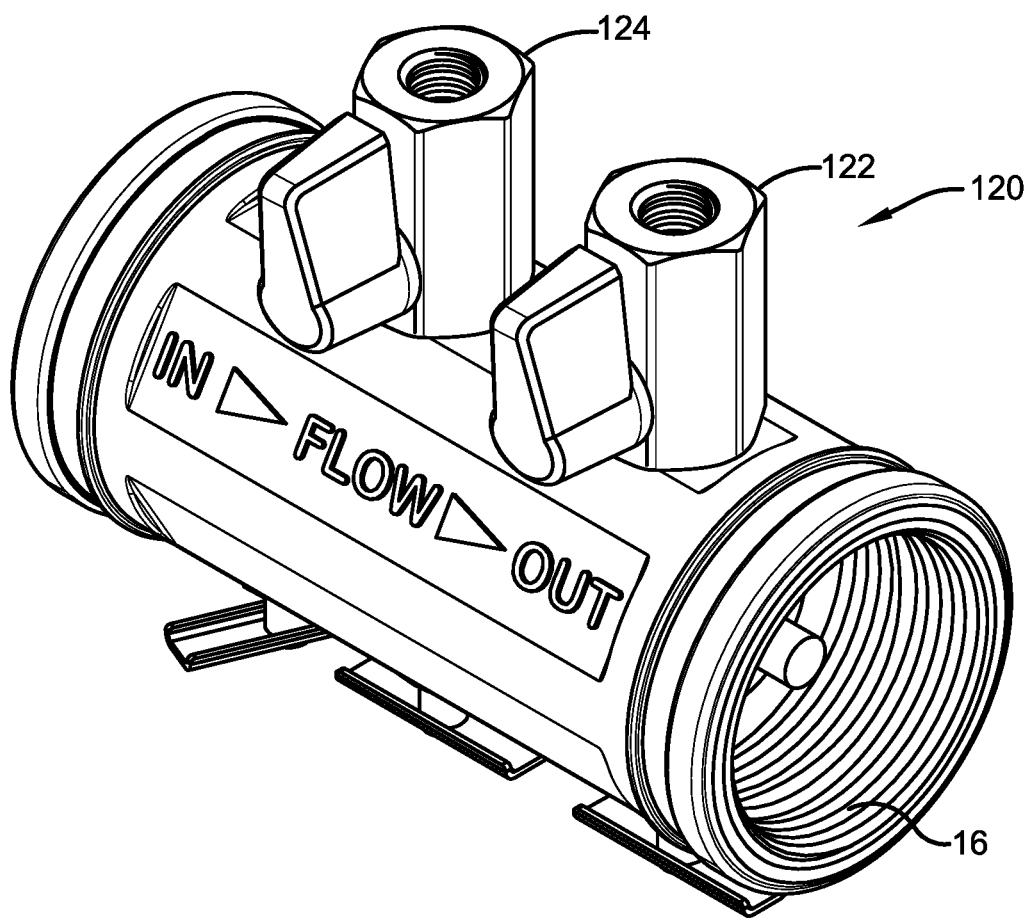
FIG. 11 is a side top back perspective view of an alternative backflow preventer arrangement.
Figure 12:
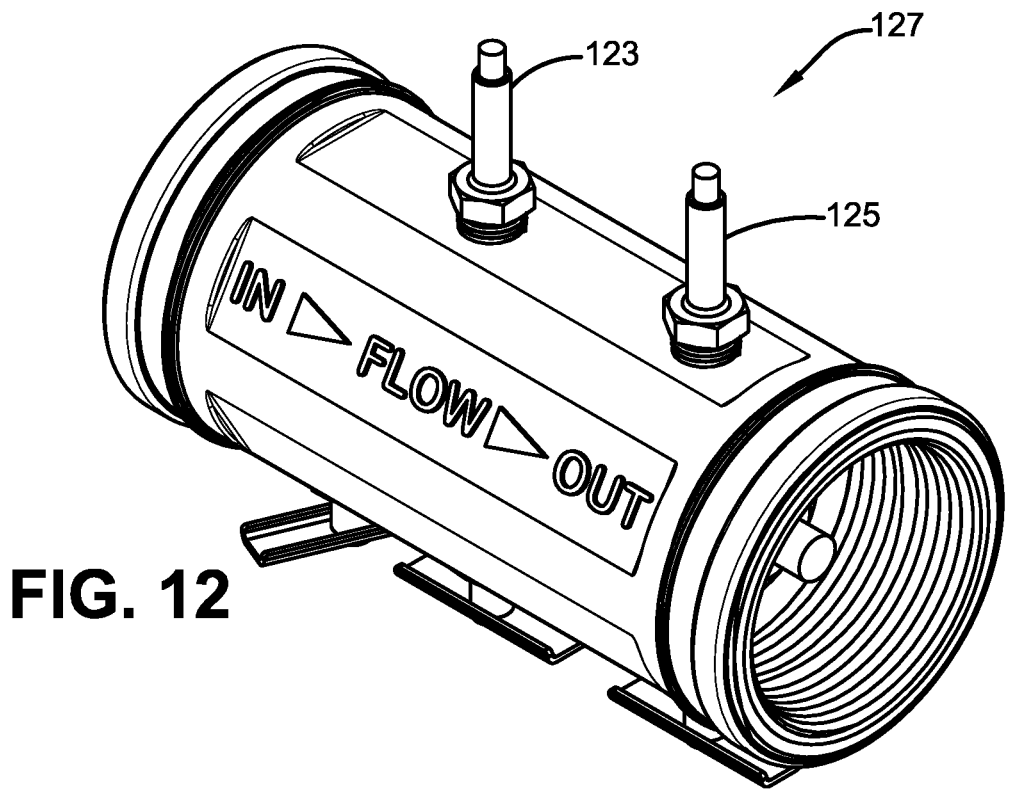
FIG. 12 is a side top back perspective view of a further alternative backflow preventer arrangement.
Figure 13:
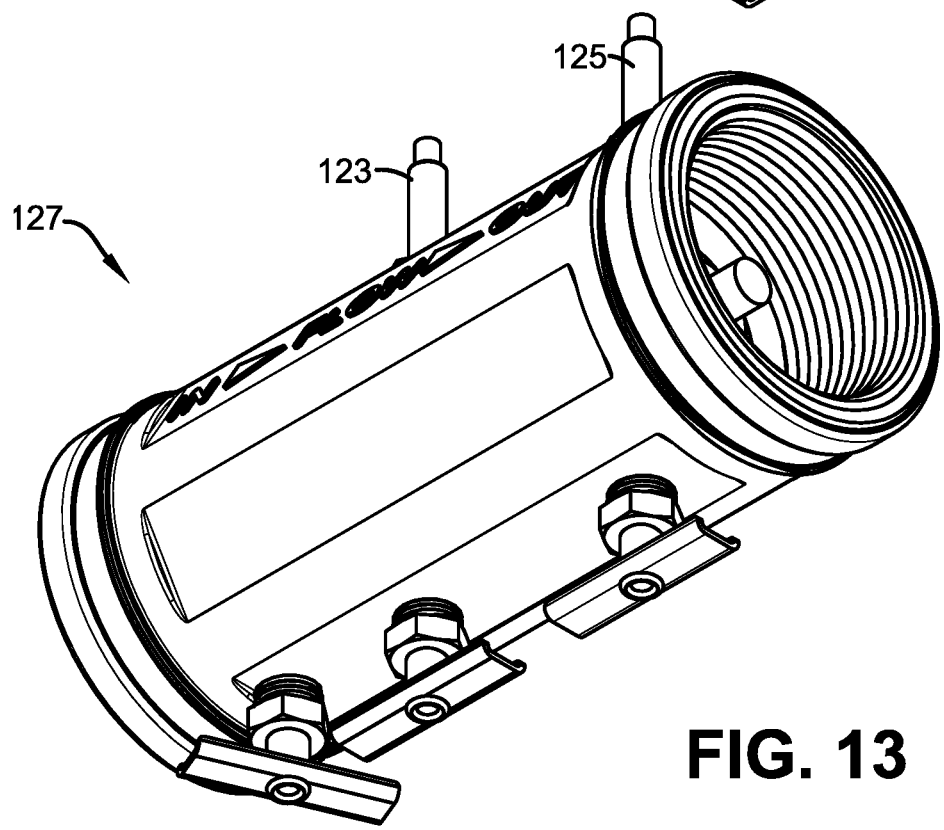
FIG. 13 is a side bottom back perspective view of the further alternative arrangement of FIG. 12.
Figure 14:
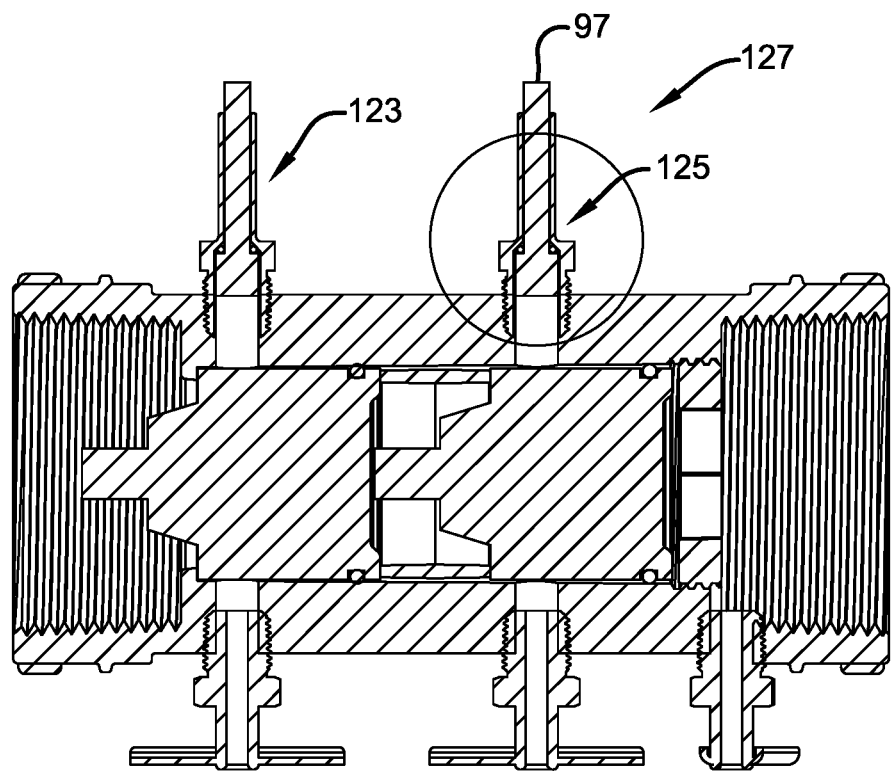
FIG. 14 is a cross-sectional view of the further alternative arrangement of the backflow preventer arrangement of FIG. 12.

For example, FIG. 11 shows an alternative arrangement of a backflow preventer generally indicated 120. The alternative arrangement includes three pressure relief ports and associated manually openable and closable valves similar to those connected to backflow preventer 10. However in backflow preventer 120 the pressure indicator ports are in operative connection with manual valves 122 and 124. Manual valves 122 and 124 may be fluidly connected to different types of indicators or conduits that connect to pressure indicators such as remote gages or electronic sensors which enable sensing of the pressure within the sealed areas of the bore of the backflow preventer. In this exemplary arrangement such pressure indicators may be located remotely from the backflow preventer and may be selectively disconnected from the backflow preventer through the operation of the respective manual valve to which the indicator is connected. Of course it should be understood that this approach is exemplary and other arrangements other approaches may be used.

Figure 7:
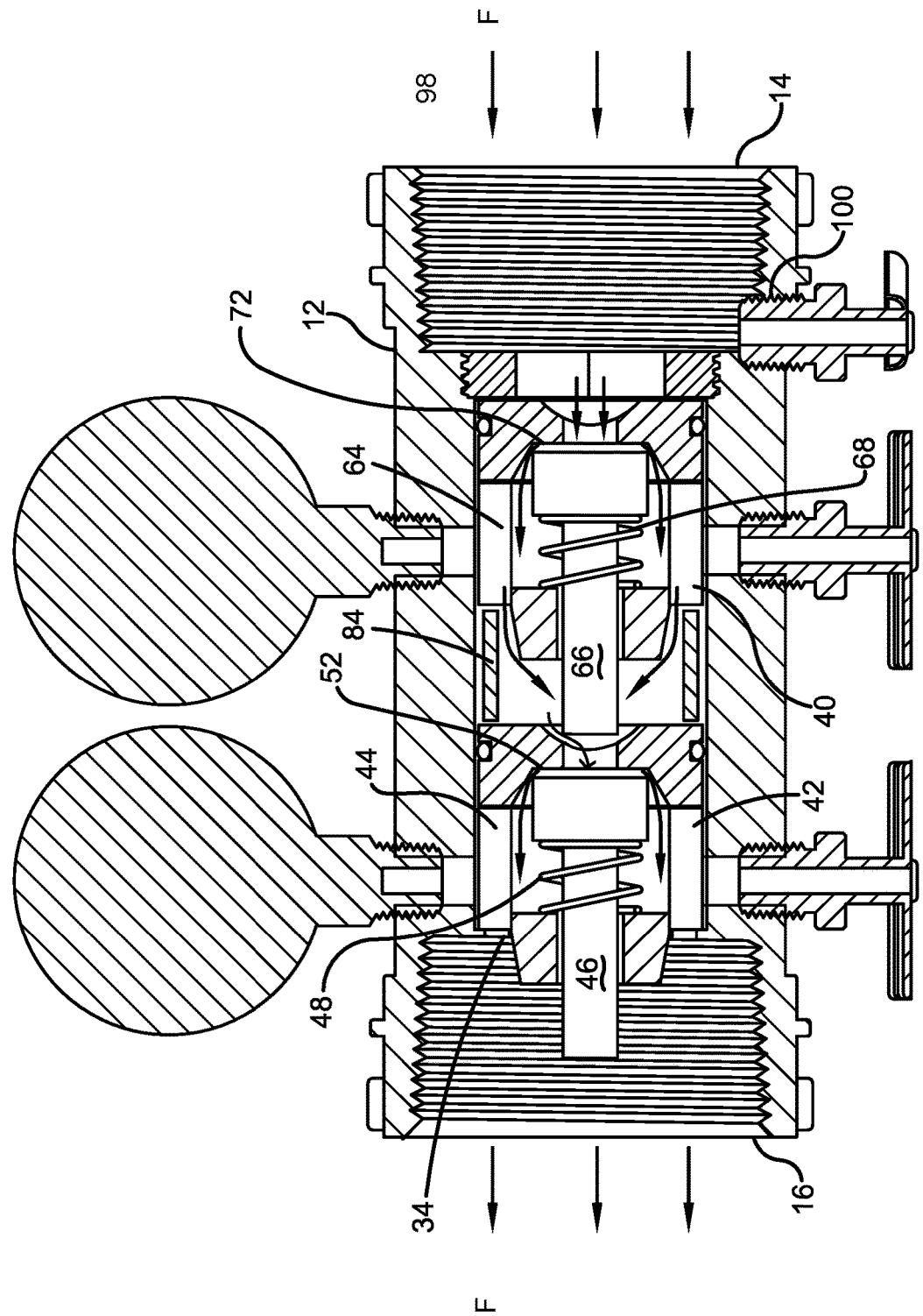
FIG. 7 is a cross-sectional view similar to FIG. 6 with arrows representing the flow of liquid through the backflow preventer.

As represented in FIG. 7 liquid pressure acting in the direction of the liquid flow F that is allowed by the backflow preventer is operative to act through the inlet port 14 and the plug flow passage 98 to cause the first check valve element to be moved against the force of spring 68 to a check valve open position in which the base of the check valve element 66 is disposed away from the seat 72. This enables liquid flow through the cylindrical body 64 of the check valve 40. The liquid flow is enabled through the first check valve 40 and into the central opening 90 of the spacer 84. Liquid pressure acts on the base of the check valve element 46 of the second check valve 42. The pressure displaces the base of check valve element 46 away from the seat 52 so that the liquid can flow through the cylindrical body 44 of the second check valve. The liquid then passes through the access opening 34 and from the body 12 through the outlet port 16.

As can be appreciated, in the event that the pressure force of the liquid falls below the spring force which acts on either of the check valve elements, the check valve elements will close. The movement of one or both of the first and second check valve elements to the closed position is operative to prevent fluid flow in an opposed direction from the outlet port 16 to the inlet port 14. This prevents the flow of liquid from the downstream system into the line which normally supplies the liquid to the valve. Conditions which may cause the pressure force acting at the inlet port to fall to such a level may be include circumstances such as a water main break which causes pressure to fall or even suction to be produced at the inlet port of the backflow preventer. Such circumstances may alternatively arise when high liquid flow is occurring in the source of liquid supply at another location. This may include for example, a situation where a fire department is drawing water from a hydrant using a pump for purposes of fighting a fire. In such circumstances the supply line to the backflow preventer may be at a lower pressure than the system on the downstream side of the backflow preventer, including at a zero pressure or even at a negative pressure. In such circumstances both check valve elements are operative to move to the check valve closed position. This prevents any chemicals or other contaminants that may be in a line or a device that is connected downstream to the outlet port 16, from being drawn through the backflow preventer into the supply line. Of course it should be understood that these are only examples of circumstances in which a backflow preventer of an exemplary arrangement can be operative to prevent contaminants from entering a source of supply.

In exemplary arrangements the operation of the exemplary backflow preventer 10 may be tested through operation of the manual valves associated with the pressure relief ports. Such testing can be used to assure that the check valves are operating properly and preventing flow when the liquid pressure at the inlet port 14 falls to below the liquid pressure at the outlet port 16. In an exemplary arrangement a test may be conducted by shutting off the supply of liquid to the inlet port 14. This may be done by closing a manual or other valve which connects the inlet port of backflow preventer 10 to the source of supply. This may be for example, a manual valve located in a water supply line which supplies water to the backflow preventer. As can be appreciated when such a valve is closed liquid pressure is generally held in the system downstream of the closed valve including within the body 12 of the backflow preventer.

In accordance with an exemplary test procedure the valve 102 is then manually opened to relieve the pressure at the inlet port 14. In this condition with valve 102 open, the check valve element 66 should prevent any flow out of the bore between the seat 72 of the first check valve and the outlet port 16. If the first check valve 40 is operating properly the first pressure indicator 114 should continue to indicate that pressure is being held within the bore in the area between the sealed locations at seats 52 and 72. If with valve 102 open the pressure indicator 114 shows a pressure drop, this is indicative that check valve element 66 is not sealing against seat 72 and the backflow preventer is malfunctioning.

If in the test procedure after valve 102 has been opened, the first pressure indicator 114 is indicating that pressure is being held by the check valve element 66, valve 106 is manually opened. As can be appreciated, opening valve 106 relieves pressure in the bore 26 between the sealed locations at seats 52 and 72. When valve 106 is opened pressure indicator 114 will indicate the pressure drop. The indication of the loss of pressure by the first pressure indicator 114 will also indicate that the pressure indicator is operating properly. Also, if check valve element 46 is operating properly the check valve element will remain engaged with seat 52. As a result if second check valve 42 is operating properly the second pressure indicator 118 will continue to indicate that pressure is being held within the bore between the seat 52 and the outlet port 16. If the check valve element 46 is not sealed against the seat 52 the opening of valve 106 will also cause an indication of the loss of pressure by the second pressure indicator 118. This will be an indication of a malfunction of the second check valve 42.

In the exemplary test procedure if it appears that the second check valve 42 is operating properly, the valve 110 can then be opened. Opening valve 110 relieves the pressure between the seat 52 and the outlet port 16. This will then cause the second pressure indicator 118 to indicate a pressure drop. The indication of the pressure drop by the pressure indicator 118 indicates that the pressure indicator is properly operating. If the results of the test indicate that the backflow preventer is operating properly, the manual valves 102, 106 and 110 can be closed and the backflow preventer returned to service.

If a malfunction is detected during the exemplary test the exemplary backflow preventer may be repaired by repairing or replacing the check valves. In the exemplary arrangement to repair or replace the check valves the fittings from the inlet and outlet lines are removed from the inlet port 14 and the outlet port 60 respectively. Once the body of the check valve has been disconnected from the lines, an appropriate tool can be used to access the plug flow passage 98 of the plug 94. In this exemplary arrangement the tool can be engaged in the plug flow passage 98 and rotated so as to disengage the external threads on the plug 94 from the internal threads on the insertion opening 38. The plug 94 can then be removed from the body through the inlet opening 14.

Figure 2:
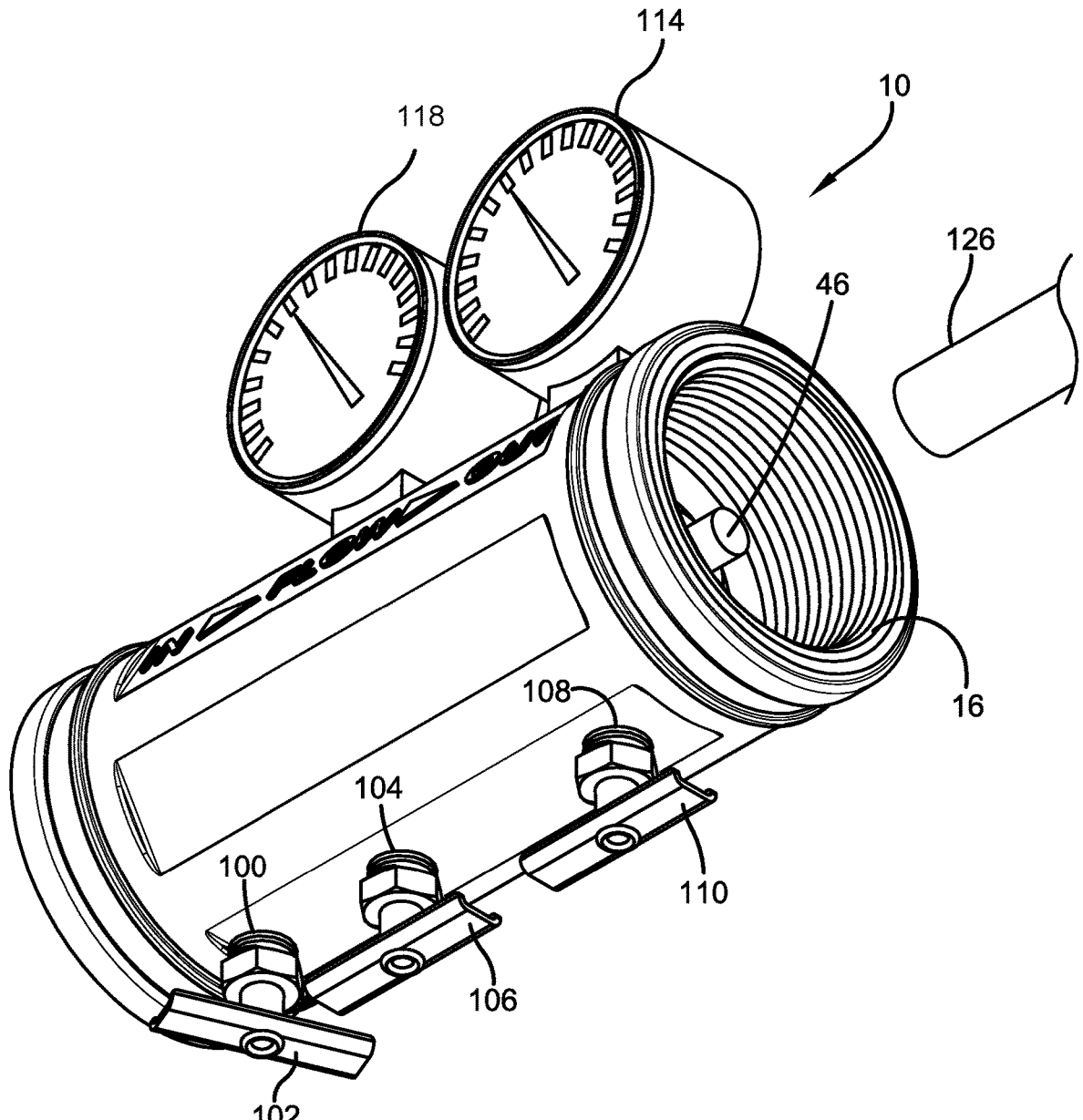
FIG. 2 shows a bottom side back perspective view of the backflow preventer.
Figure 3:
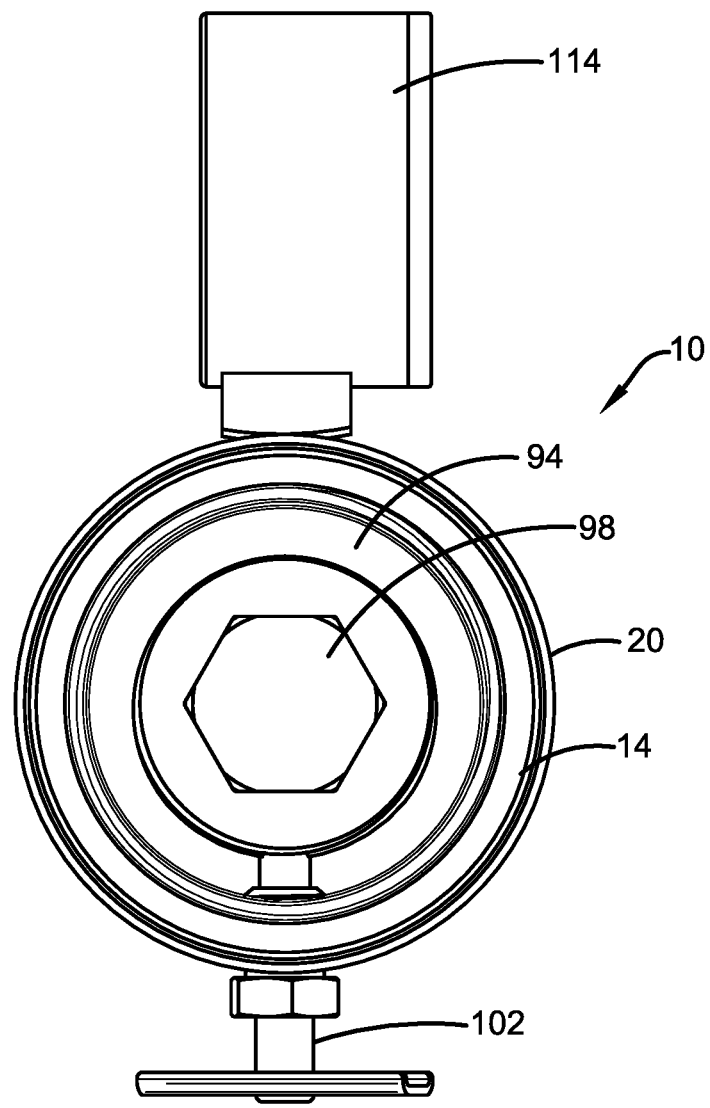
FIG. 3 shows a front view of the backflow preventer.
Figure 4:
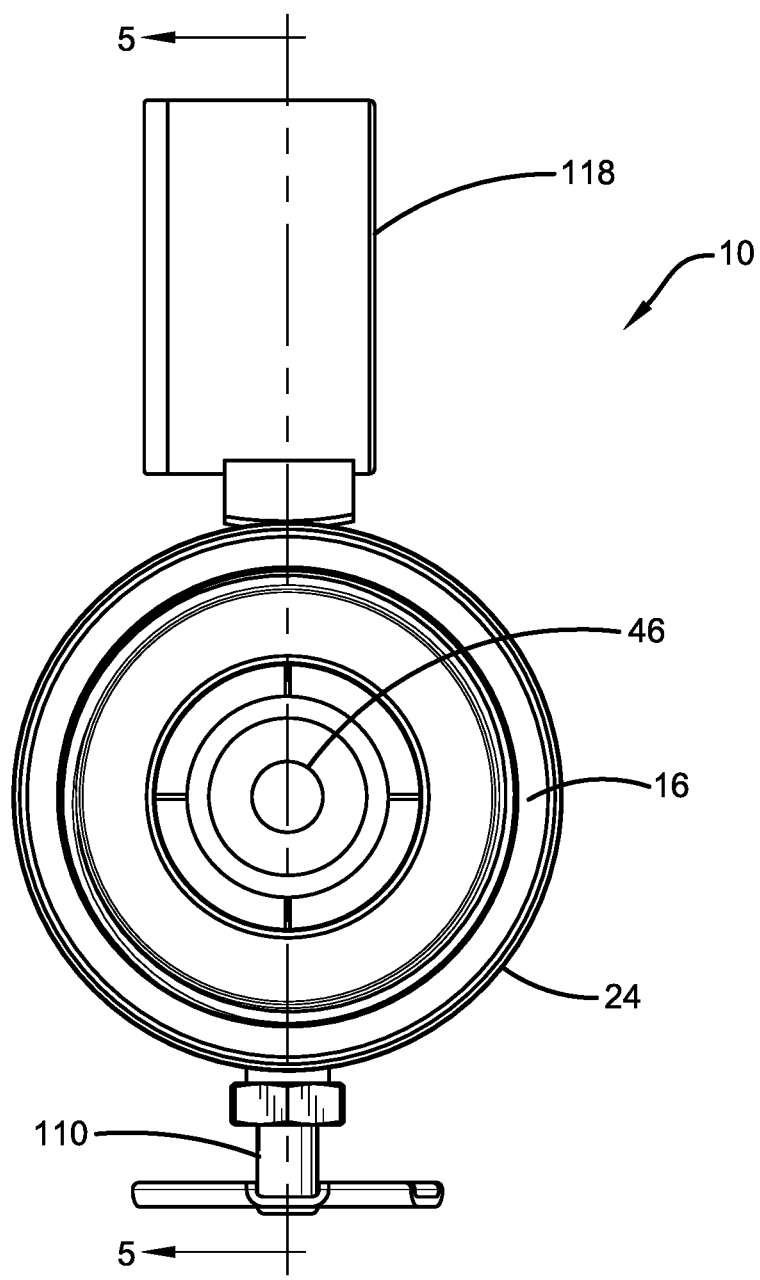
FIG. 4 shows a back view of the backflow preventer.

An item such as a rod 126 as shown in FIG. 2 may then be extended in the outlet port 16 to engage the portion of the second check valve 42 that extends through the access opening 34. For example in some arrangements the rod 126 may be axially engaged with check valve element 46 and used to push check valve 42, spacer 84 and check valve 40 out of the bore 26 through the insertion opening 38. The check valves and the spacers are enabled to pass out of the body through the inlet opening 14. Alternatively is some arrangements the check valves may be displaced from the operative positions in the bore through manual finger engagement through the outlet port.

Once the check valves have been removed from the bore they may be inspected and repaired so that they operate properly. Alternatively in other arrangements a check valve which has malfunctioned may be replaced with a new check valve. The repaired or replacement check valves may then be reinstalled in the bore by passing the second check valve 42 through the inlet port and the insertion opening and into the internal bore 26. The spacer may then be passed through the insertion opening 38 and into the bore. Then the check valve 40 may be passed through the insertion opening and into the bore. The check valves and the spacer are moved axially in the bore toward the outlet port until the back faces 58 of the vanes 54 of check valve 42 engage the radially inward extending step 32. Once in this position the plug 94 may be passed through the inlet port 14 and threadably engaged in the insertion opening 38. The exemplary plug flow passage 98 may then be engaged with a tool and rotated so as to threadably engage the plug in the insertion opening. Once the plug is rotated to a snug position so that the cylindrical bodies of the check valves are in abutting engaged relation with the spacer, the tool may be removed from the plug flow passage 98. The backflow preventer may then be returned to service.

The exemplary arrangement provides the advantage that in the event that a check valve is installed improperly, no flow will occur through the central bore 26. Further in the exemplary arrangement if the plug 94 is not reinstalled in the insertion opening, the check valves and the spacers will still be held in the appropriate operative positions by the radially inward extending step 32. Further in the exemplary arrangement with the translucent body external visual inspection of the assembly through the translucent body helps to assure that the check valves, the spacer and the plug have been installed and positioned properly. Of course it should be understood that these features are exemplary and in other arrangements other approaches may be used.

FIGS. 12-15 show a further alternative arrangement of a backflow preventer 127. Backflow preventer 127 has similar features to backflow preventer 10 except as otherwise expressly indicated. Backflow preventer 127 includes pressure indicators 125 and 123. Pressure indicators 125, 123 are plunger type indicators which provide a visual indication of the presence of elevated fluid pressure above a set level at the corresponding pressure indicating port in which the pressure indicator is installed. In this exemplary arrangement each of the pressure indicators 125, 123 are the same. However in other arrangements different types of pressure indicators may be utilized in connection with a common backflow preventer.

As shown in greater detail in FIG. 15 the exemplary plunger type pressure indicator 125 includes a housing 121. The housing 121 includes a threaded end 119 that is engaged with a respective pressure indicating port on the body of the backflow preventer. The housing 121 further includes an elongated tubular end 117 that terminates at an outer opening 115. The housing 121 further includes a hexagonal portion 113 that facilitates engagement with a wrench when installing the pressure indicator in or removing the pressure indicator from the respective pressure indicating port.

The exemplary pressure indicator 125 further includes a cylindrical inner chamber 111. The cylindrical inner chamber extends proximate to the threaded end 119 of the housing 121. An outer chamber 109 extends from the inner chamber 111 through the elongated tubular end 117 to the outer opening 115. In the exemplary arrangement the inner chamber 111 has a larger diameter than the outer chamber 109. A tapered transition step 107 extends between the inner chamber and the outer chamber. A resilient seal 105 extends in abutting relation with the transition step 107.

A plunger member 103 is movably mounted in the housing 121. The exemplary plunger member includes a base portion 101. The base portion 101 is generally cylindrical in the exemplary arrangement, and is movable in the inner chamber 111. The exemplary plunger member 103 further includes a stem portion 99. The exemplary stem portion 99 is of a smaller diameter than the base portion 101 and is movable in the outer chamber 109. The exemplary stem portion 99 includes an outer end 97. The outer end 97 is configured to extend outwardly from the outer opening 115 when the plunger member is disposed to its fullest outward extent in the housing 121. The outer end 97 when in the outward position, is readily visually observed.

In the exemplary arrangement the plunger member 103 is movable outwardly in the housing 121 responsive to positive fluid pressure in the respective interior area of the backflow preventer body to which it is directly fluidly connected above a set level. The presence of fluid pressure at the respective pressure indicating port in which the pressure indicator 125 is installed, causes the plunger member to move outwardly such that the outer end 97 is disposed outwardly beyond the outer opening 115. This provides a visible indication that positive fluid pressure is present at the pressure indicating port. In the exemplary arrangement the resilient seal 105 enables the plunger member 103 to move relative to the housing 121 without the loss of liquid from the elongated tubular end 117 of the housing.

In the exemplary arrangement to determine if positive fluid pressure is present at the pressure indicating port to which the pressure indicator is connected, the outer end 97 of the plunger member may be pressed manually inwardly toward the outer opening 115. If the positive fluid pressure is present, the plunger member when manually pressed inward will promptly return to the position in which the outer end 97 extends outwardly beyond the outer opening 115. Also in exemplary arrangements when pressure has been released from the interior area of the backflow preventer, the plunger member 103 may be depressed. Thereafter when pressure is restored to the interior area of the backflow preventer to which the pressure indicator is directly fluidly connected, the plunger member will promptly move outwardly such that the presence of the fluid pressure is indicated by the outer end 97 of the plunger member extending outwardly from the outer opening 115. Thus the exemplary arrangement provides a cost effective and reliable pressure indicator that can be used in connection with a backflow preventer for purposes of verifying proper operation and testing.

Further in some exemplary arrangements the plunger type pressure indicator may be modified to include a biasing member such as a spring so that the plunger member is automatically retracted responsive to a drop in pressure at the respective pressure indicating port. Alternatively in other exemplary arrangements the plunger member may be weighted such that in an appropriate upright orientation the plunger member is automatically retracted responsive to a loss in pressure. Further in other alternative exemplary arrangements magnetic elements may be utilized in connection with the housing and plunger member so as to provide automatic retraction of the plunger member responsive to a loss in pressure. Of course it should be understood that these approaches are exemplary and in other arrangements other approaches may be used.

Figure 16:
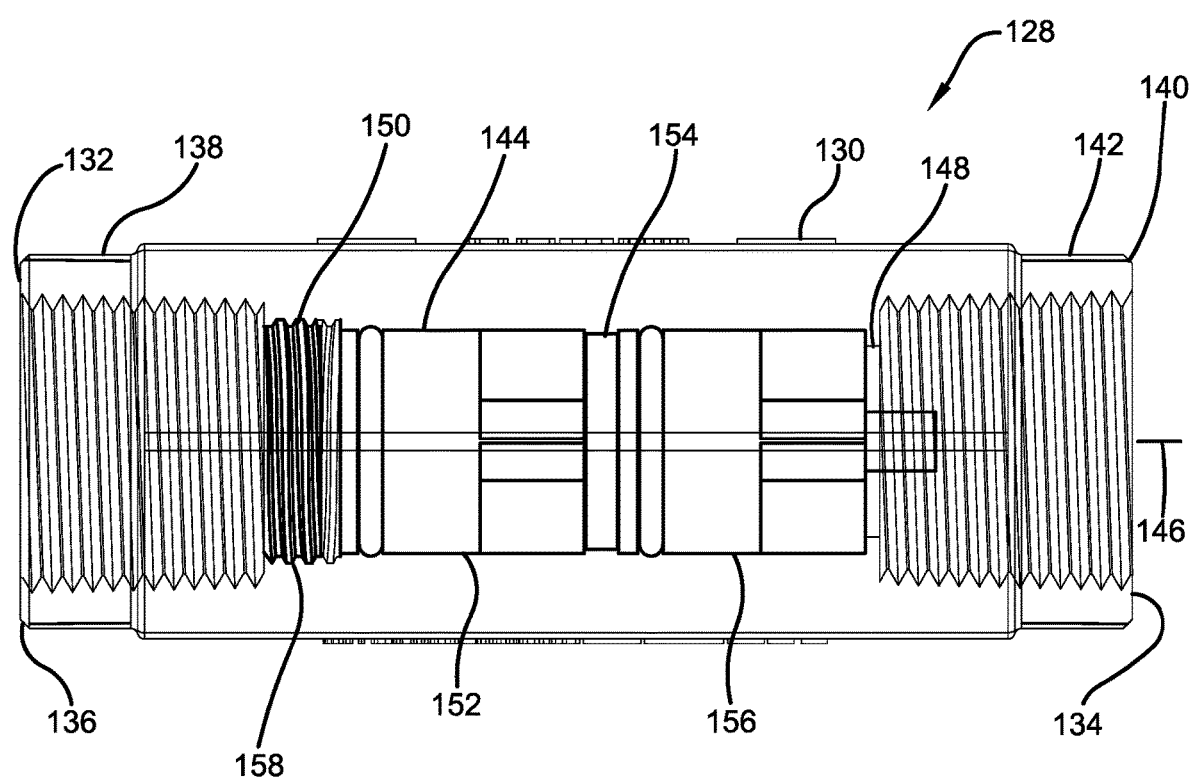
FIG. 16 is a side transparent view of another alternative backflow preventer arrangement.
Figure 17:
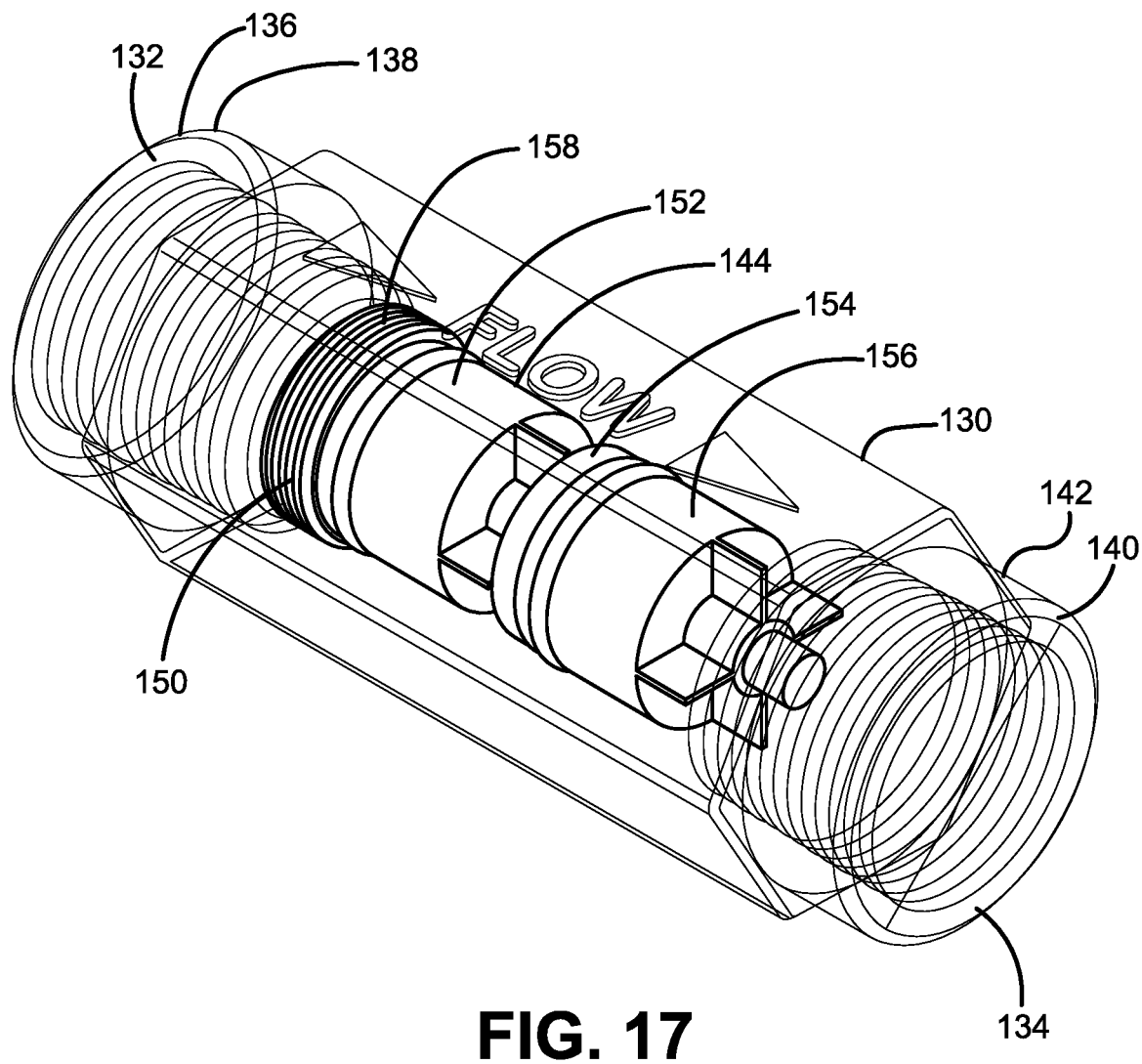
FIG. 17 is a side top back perspective transparent view of the backflow preventer arrangement of FIG. 16.
Figure 18:
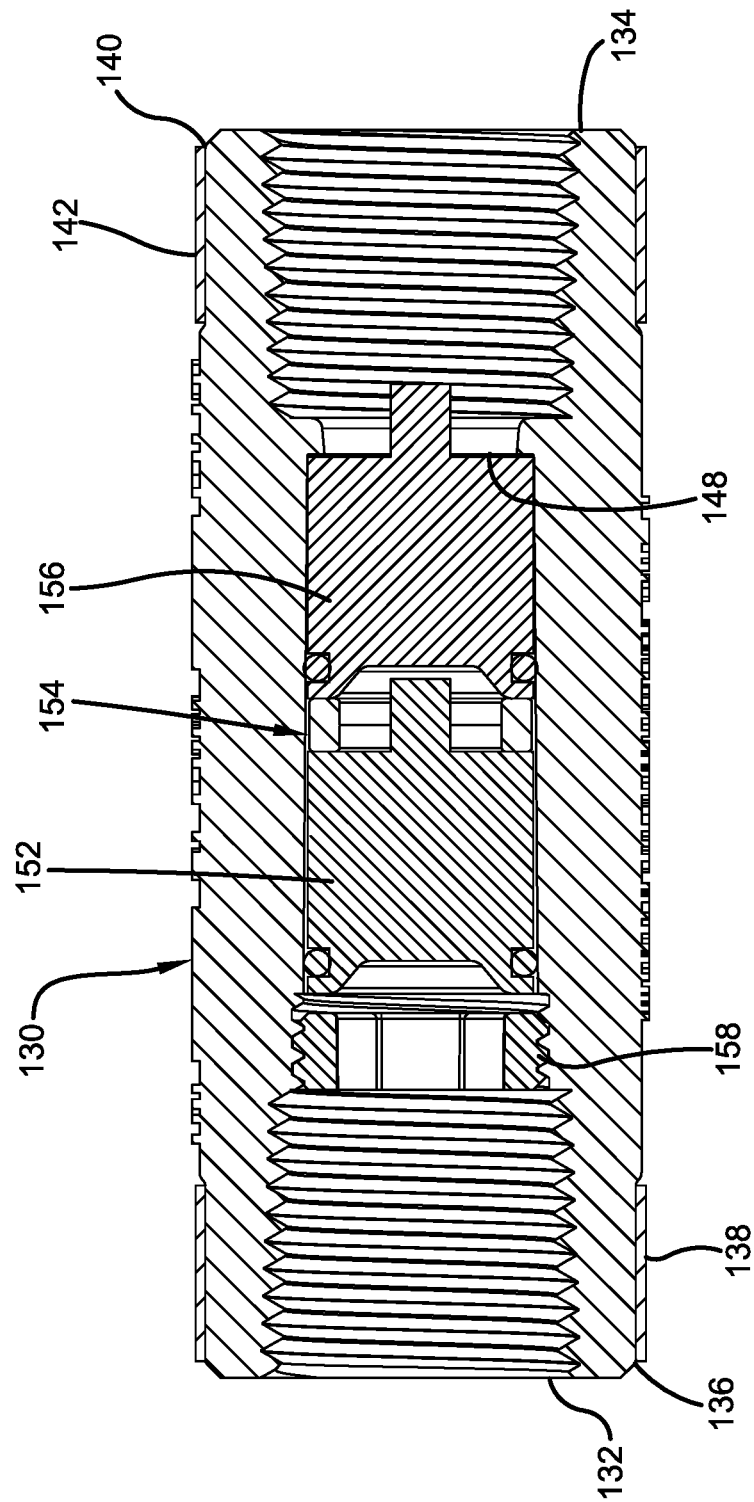
FIG. 18 is a cross-sectional view of the backflow preventer arrangement of FIG. 16.

Other exemplary arrangements of backflow preventers including features like those discussed in connection with backflow preventer 10 may be produced. For example, FIGS. 16-18 show an alternative arrangement of a backflow preventer 128. Backflow preventer 128 includes a body 130 with an inlet port 132 and an outlet port 134. The exemplary body 130 in some arrangements may be comprised of a single piece of material. In some arrangements the material may be a plastic material like that previously discussed. In some arrangements the material may be translucent. In the exemplary arrangement each of the inlet port 132 and the outlet port 134 are comprised of threaded ports so as to provide fluid tight engagement with appropriate liquid conduit fittings.

Exemplary body 130 includes an annular inlet port overlying surface 136 that extends radially outward from and in surrounding relation of the inlet port 132. In an exemplary arrangement in which the body is comprised of plastic a metallic reinforcing ring 138 extends in surrounding relation of the overlying surface 136. In some exemplary arrangements in which the body is comprised of a plastic material the use of a reinforcing ring which is more resistant to radially outward deformation than the plastic material of the body may be utilized to reduce the risk of cracking or other failures that might result from over tightening of fittings installed in the inlet port Body 130 further includes an annular outlet port overlying surface 140 that extends radially outward from and in surrounding relation of the outlet port 134. A metallic reinforcing ring 142 extends in continuous surrounding relation of the overlying surface 140. In some exemplary arrangements the reinforcing rings may be comprised of stainless steel. In other exemplary arrangements reinforcing rings or other separate reinforcing structures may not be used.

In the exemplary arrangement a cylindrical bore 144 extends through the body along an axis 146. The inlet port 132 and the outlet port 134 are axially centered on the body. Similar to the previously described arrangements, an annular radially inward extending step 148 bounds the bore 144 at a first axial end adjacent the outlet port 134. A threaded insertion opening 150 extends at an opposed end of the bore.

In an operative position, a first check valve 152, a spacer 154 and a second check valve 156 are moveably positioned in the bore. Check valves 152 and 156 include movable check valve elements which may be similar to the check valve elements of the check valves previously discussed. Further, each of the exemplary check valves may include an annular recess with an annular resilient seal therein that prevents liquid flow between the cylindrical check valve body and the cylindrical wall which bounds the bore 144. Further in the exemplary arrangement a plug 158 is positioned in engaged relation with the insertion opening 150 in the operative position of the backflow preventer. The exemplary plug 158 may be of a similar configuration to the plugs 94 or 95 previously discussed. The exemplary plug 158 is threadably engageable in the insertion opening and removable therefrom through rotation of the tool that is engaged with the one or more plug flow passages.

The exemplary backflow preventer 128 does not include pressure relief ports or pressure indicating ports like backflow preventer 10. However, in arrangements in which a translucent material is used for the body the exemplary backflow preventer 128 enables a user to observe through the translucent body 130 the position of the check valve elements of the check valves 156 and 158. The external visual observation of the positions of the movable check valve elements of the check valves is operative to enable user to observe whether the check valve elements are positioned and operating properly.

As with the previously described arrangements, the check valves 156, 158 of backflow preventer 128 are enabled to be removed from the bore 144 and repaired or replaced. This is done in a manner like that previously discussed via the removal of the plug 158 and the displacement of the check valves and spacer from the bore 144. The repaired or replaced check valves, spacer and plug can then be replaced and reinstalled in the bore to return the backflow preventer into service. Further it should be understood that while in the exemplary arrangement a one piece body is utilized for the exemplary body, in other arrangements other types of materials or assemblies may be utilized. For example, in some applications metallic materials such as stainless steel or other metallic materials may be utilized for the backflow preventer body. Alternatively or in addition other exemplary arrangements may use non-translucent plastics or other material types for the exemplary body structures and other structures that have been described herein. Of course it should be understood that the described arrangements are exemplary and in other arrangements other approaches may be used.

Figure 20:
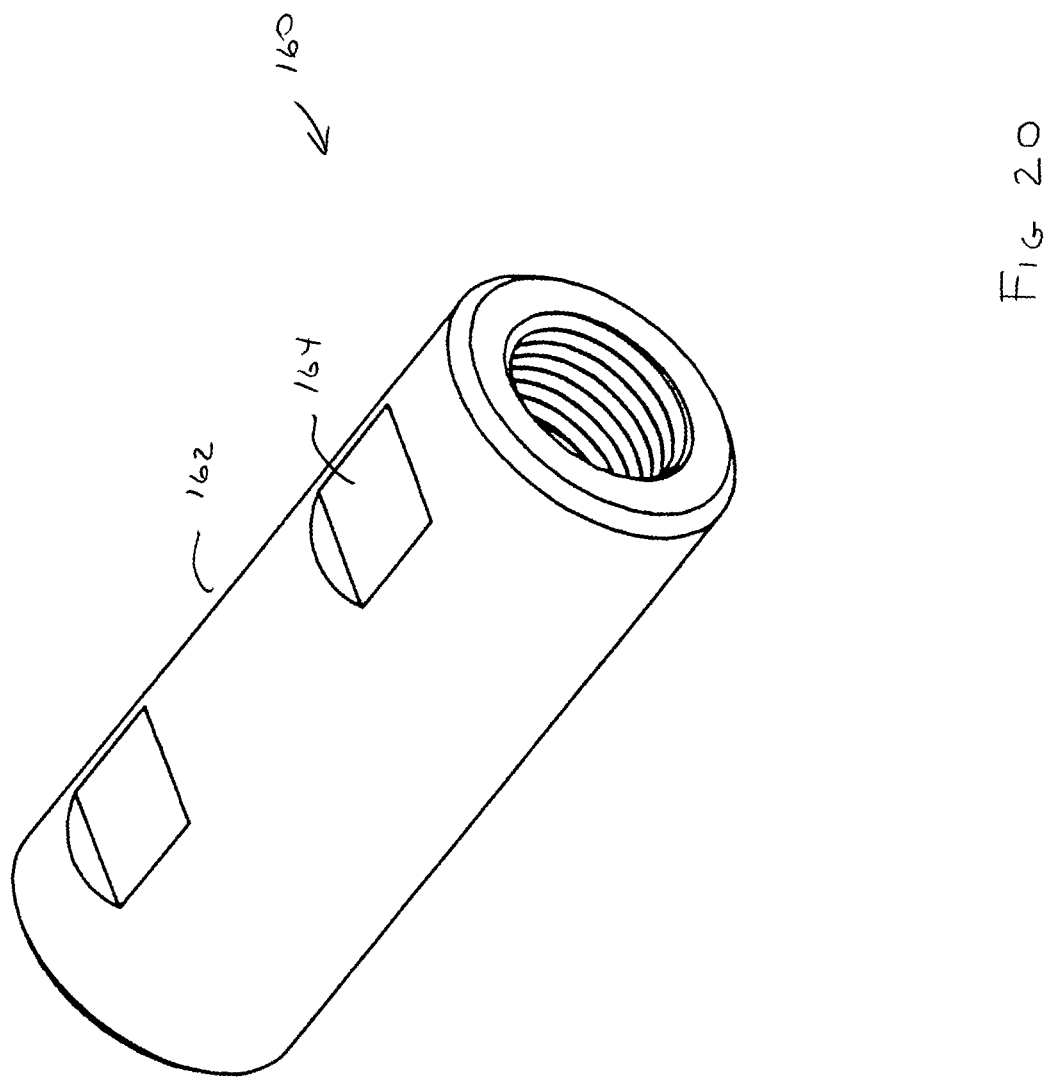
FIG. 20 is a perspective view of an alternative backflow preventer body.

For example, FIG. 20 shows an alternative configuration of a backflow preventer 160. Backflow preventer 160 includes a body 162 with a generally continuous cylindrical outer surface that extends the axial length of the body. Similar to the previously described arrangements the backflow preventer includes an inlet port and an outlet port. The backflow preventer 160 may include an internal cylindrical bore that houses removable check valves and other structures similar to those discussed in connection with the previously described arrangements.

The exemplary backflow preventer 160 includes axially spaced diametrically opposed wrench engageable flats 164 on the generally cylindrical outer surface 162 of the body. Of course in FIG. 20 only one side of the body and the flats on that side are shown. In this exemplary arrangement the backflow preventer is configured to have a body with a relatively thicker configuration radially from the port openings to the outer body surface which provides greater resistance to cracking and breaking due to over tightening of fittings in the ports or other potentially damaging conditions. Further the exemplary backflow preventer body 160 may be produced more economically than some other configurations due to a smaller number of components and features which must be externally formed on the body part.

FIG. 21 shows another backflow preventer 166. Backflow preventer 166 includes a body 168. The exemplary body 168 includes an inlet port and an outlet port similar to the previously described arrangements. Backflow preventer 166 may also include an internal cylindrical bore with movable releasably positioned check valves, a spacer, a plug and other structures like those previously discussed.

The exemplary body 168 includes a pair of cylindrical end portions 170 that each radially outwardly overlie the respective inlet port and an outlet port. Intermediate of the end portions the body includes a hexagonal middle section 172. The hexagonal section 172 facilitates engaging the body with a tool to facilitate tightening and loosening of fittings in the inlet and outlet ports. As shown in the exemplary arrangement, the hexagonal section 172 includes diametrically opposed flat surfaces that are spaced apart a smaller distance than the diameters of the cylindrical end portions. As a result in the exemplary arrangement the end portions provide greater strength and reinforcement in the areas of the inlet port and an outlet port while facilitating tool engagement of the hexagonal section to facilitate fitting engagement and disengagement with the backflow preventer. Of course it should be understood that this configuration is exemplary and other arrangements other configurations may be used.

In some exemplary arrangements the bodies of the backflow preventers may be comprised of aluminum. In some arrangements the body may be comprised of a single aluminum piece. In some exemplary arrangements the aluminum may be a hard anodized aluminum material that has a surface coating of aluminum oxide that is produced through hard coat anodizing that renders the aluminum body resistant to corrosion due to water and other liquids.

In exemplary arrangements the body of the valve may be comprised of hard anodized aluminum while the removable check valve bodies and other structures may be comprised of plastics or other materials. In exemplary arrangements the hard coat anodizing is carried out through a process which includes carrying out an electrolytic treatment with the aluminum body connected as the anode and the electrolyte holding tank including a cathode that is disposed away from the anode. In exemplary arrangements the body is exposed to an electrolyte which is comprised of cold sulfuric acid. For purposes hereof cold sulfuric acid will be considered to be at a temperature lower than 2° C. In exemplary arrangements contact of the cold sulfuric acid electrolyte with the internal and external surfaces of the aluminum is achieved along with agitation, mixing, air bubbling and/or flow of the electrolyte to expose all the internal and external surfaces of the body to the electrolyte as the electrolysis is carried out.

In the exemplary arrangement the reaction causes conversion of the aluminum at the exposed surfaces to a hard aluminum oxide. The reaction causes the aluminum oxide coating to grow and penetrate into the original surface of the body as well as to cause the body dimensions to grow externally. Generally the external growth of the coating outward on the surfaces is equal to the thickness of coating penetration into the original surface location. As a result the dimensional properties of the original body prior to anodizing usually must be adjusted so that the final dimensions of the body after being hard coat anodized are consistent with the dimensions required for operation.

In exemplary arrangements the hard anodized process is carried out to achieve a total coating thickness in a range of about 0.003 inches to 0.007 inches. In exemplary arrangements the hardness that is achieved on the surface is greater than the hardness of many stainless steels. Further in exemplary arrangements bodies that have been subject to the hard coat anodizing process are used in an exemplary backflow preventer body with an unsealed anodized surface. This is because the exemplary hard coat anodizing process does not produce a porous surface similar to regular anodizing. Further the exemplary arrangements render the coated surfaces of the aluminum body wear resistant, electrically nonconductive and corrosion resistant.

In exemplary arrangements numerous different backflow preventer body configurations may be produced by starting with a body part that is a single piece of aluminum that is subject to being hard coat anodized. Such arrangements may have useful properties particularly in connection with backflow preventers which are utilized in water systems in which the use of aluminum is normally sought to be avoided. However in the exemplary arrangements using the hard coat anodized bodies, corrosive reactions and galvanic effects normally encountered when aluminum fittings are exposed to water are avoided. Of course it should be understood that these approaches may be utilized in connection with backflow preventer arrangements of the types described herein as well as in connection with other backflow preventer configurations.

Thus the exemplary arrangements described herein achieve improved operation, eliminate difficulties encountered in the use of prior devices and systems, and attain the useful results described herein.

In the foregoing description, certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the new and useful arrangements are not limited to the exact features and arrangements that have been shown and described.

It should be understood that the features and/or relationships associated with one arrangement can be combined with features and/or relationships from other arrangements that have been described herein. That is, various features and/or relationships from the various arrangements can be combined to create further arrangements. The novel and nonobvious scope of the arrangements described in this disclosure is not limited only to the arrangements which have been shown and described herein.

Having described features, discoveries and principles of the exemplary arrangements, the manner in which they are constructed and operated, and the advantages and useful results attained; the new and useful features, devices, elements, arrangements, parts, combinations, systems, equipment, operations, methods, processes and relationships are set forth in the appended claims.

I claim:

1. Apparatus comprising:
a backflow preventer, including
  a body, wherein the body includes an axially extending central bore that extends axially intermediate of an inlet port and outlet port,
  a first check valve element and a second check valve element removably positioned in the central bore, wherein each of the first check valve element and the second check valve element are removable from the central bore through at least one of the inlet port and the outlet port,
  wherein the first check valve element and the second check valve element enable liquid flow through the central bore from the inlet port to the outlet port and prevent liquid flow in an opposed direction, wherein each of the first check valve element and second check valve element have a respective valve element open position in which liquid is enabled to flow past the valve element, and a respective valve element closed position in which liquid is prevented from flowing past the valve element,
  wherein the central bore includes within the body an internally threaded insertion opening, wherein the insertion opening is coaxially arranged with the bore,
  a plug, wherein the plug is externally threaded and includes at least one plug flow passage that extends axially through the plug,
  wherein the plug is configured to be releasably engaged in the insertion opening,
  wherein threaded engagement of the plug in the insertion opening is operative to cause the first check valve element and the second check valve element to be held within the central bore, and
  wherein disengagement of the plug from the insertion opening enables the first check valve element and the second check valve element to be removable from the central bore.

2. The apparatus according to claim 1
wherein the body is comprised of translucent material,
wherein at least a portion of each of the first check valve element and the second check valve element are visible from outside the backflow preventer through the translucent body such that it is externally visually observable that
  the first check valve element is in either the first check valve element open position or the first check valve element closed position, and
  the second check valve element is in either the second check valve element open position or the second check valve element closed position.

3. The apparatus according to claim 1
wherein the body is comprised of translucent material,
wherein the at least a portion of each of the first check valve element and the second check valve element are visible from outside the backflow preventer through the translucent body such that
  it can be observed that the first check valve element is in the first check valve element open position when the first check valve element is in the first check valve element open position, and it can be observed that the first check valve element is in first check valve element closed position when the first check valve element is in the first check valve element closed position, and
  it can be observed that the second check valve element is in the second check valve element open position when the second check valve element is in the second check valve element open position, and it can be observed that the second check valve element is in the second check valve element closed position when the second check valve element is in the second check valve element closed position.

4. The apparatus according to claim 1
wherein the second check valve element is movably mounted on a second check valve cylindrical body, wherein the second check valve cylindrical body includes at least one back face,
wherein the second check valve cylindrical body is axially movable in the central bore, and
wherein the central bore includes a radially inward extending step surface, wherein the at least one back face is in abutting engaged relation with the radially inward extending step surface,
whereby the second check valve cylindrical body is axially held in position in the central bore through engagement of the at least one back face and the step surface.

5. The apparatus according to claim 1
wherein the central bore comprises a cylindrical bore,
wherein the second check valve element is movably mounted on a second check valve cylindrical body, wherein the second check valve cylindrical body includes at least one back face,
wherein the second check valve cylindrical body is axially movable in the central bore, and
wherein the central bore includes a first axial end, wherein the central bore adjacent the first axial end includes a radially inward extending step surface, wherein the at least one back face is in abutting engaged relation with the radially inward extending step surface,
wherein the central bore includes a second axial end axially opposed of the first axial end, wherein the second axial end includes the insertion opening, wherein the second check valve cylindrical body is removably positioned in the central bore through the insertion opening,
wherein the second check valve cylindrical body is axially held in position in the central bore through engagement of the at least one back face and the step surface.

6. The apparatus according to claim 1
wherein the first check valve element is movably mounted on a first check valve cylindrical body,
wherein the first check valve cylindrical body is axially movable in the central bore, and wherein the central bore includes the insertion opening,
wherein the first check valve cylindrical body is removably positioned in the central bore through the insertion opening.

7. The apparatus according to claim 1
wherein the central bore comprises a cylindrical bore, wherein the cylindrical bore is bounded by a cylindrical bore wall,
wherein the second check valve element is movably mounted on a second check valve cylindrical body, wherein the second check valve cylindrical body includes at least one radially extending back face,
wherein the second check valve cylindrical body is axially movable in the central bore, and is in fluid tight operative engagement with the cylindrical bore wall,
wherein the central bore includes a first axial end, wherein the central bore adjacent the first axial end includes a radially inward extending step surface, wherein the at least one radially extending back face is in abutting operatively engaged relation with the radially inward extending step surface,
wherein the second check valve cylindrical body is axially held in position in the central bore through operative engagement of the at least one back face and the step surface,
wherein the central bore includes a second axial end axially opposed of the first axial end, wherein the second axial end includes the insertion opening, wherein the second check valve cylindrical body is removably positioned in the central bore through the insertion opening,
wherein the first check valve element is movably mounted on a first check valve cylindrical body,
wherein the first check valve cylindrical body is axially movable in the central bore, and is in fluid tight operative engagement with the cylindrical bore wall,
wherein the first check valve cylindrical body is removably positioned in the central bore through the insertion opening.

8. The apparatus according to claim 1
wherein the body further includes
a first pressure indicating port, wherein the first pressure indicating port is in direct fluid connection with the central bore fluidly intermediate of a first sealed location and a second sealed location,
wherein the first check valve element in the first check valve element closed position prevents fluid flow through the central bore at the first sealed location and wherein the second check valve element in the second check valve element closed position prevents fluid flow through the central bore at the second sealed location,
a second pressure indicating port, wherein the second pressure indicating port is in direct fluid connection with at least one of
the outlet port, and
the central bore fluidly intermediate of the second sealed location and the outlet port.

9. The apparatus according to claim 1
wherein the body is comprised of translucent material,
wherein in the operative position of the first valve element and the second valve element in the central bore, the first check valve element and the second check valve element are observable externally through the translucent body such that it is observable whether each valve element is in the respective valve element open position or the valve element closed position.

10. The apparatus according to claim 1
wherein the body is comprised of aluminum with a cold sulfuric acid electrolyte produced anodized hardened coating having an aluminum oxide surface coating thickness of from 0.003 to 0.007 inches.

11. Apparatus comprising:
a backflow preventer, including
a body, wherein the body includes
a central bore, wherein the central bore extends along an axis,
an inlet port, wherein the inlet port is in fluid connection with the central bore,
an outlet port, wherein the outlet port is in fluid connection with the central bore,
wherein the body is comprised of aluminum with a less than 2° C. sulfuric acid electrolyte produced anodized coating having an aluminum oxide surface coating thickness of from 0.003 to 0.007 inches,
a first check valve element, wherein the first check valve element is removably positioned in the central bore, wherein the first check valve element is axially movable when positioned within the bore between a first check valve element open position and a first check valve element closed position,
wherein in the first check valve element open position liquid is enabled to flow axially in the central bore in a first axial flow direction past the first check valve element, and
wherein in the first check valve element closed position liquid is prevented from flowing in the central bore in an opposed flow direction, wherein the opposed flow direction is opposite of the first axial flow direction,
a second check valve element, wherein the second check valve element is removably positioned in the central bore, wherein the second check valve element is axially disposed in the bore from the first check valve element,
wherein the second check valve element is axially movable when positioned within the bore between a second check valve element open position and a second check valve element closed position,
wherein in the second check valve element open position liquid is enabled to flow within the central bore in the first axial flow direction past the second check valve element, and
wherein in the second check valve element closed position liquid is prevented from flowing in the central bore in the opposed flow direction,
wherein responsive to liquid pressure acting in the first axial flow direction
the first check valve element is movable from the first check valve element closed position to the first check valve element open position, and
the second check valve element is movable from the second check valve element closed position to the second check valve element open position.

12. The apparatus according to claim 11
wherein the central bore comprises a cylindrical bore,
wherein the second check valve element is movably mounted on a second check valve cylindrical body, wherein the second check valve cylindrical body includes at least one radially extending back face,
wherein the second check valve cylindrical body is axially movable in the central bore, and
wherein the central bore includes a first axial end, wherein the central bore adjacent the first axial end includes a radially inward extending step surface, wherein the at least one radially extending back face is in operatively abutting engaged relation with the radially inward extending step surface, wherein the second check valve cylindrical body is axially held in position in the central bore through operative engagement of the at least one back face and the step surface, wherein the central bore includes a second axial end axially opposed of the first axial end, wherein the second axial end includes an insertion opening, wherein the second check valve cylindrical body is removably positioned in the central bore through the insertion opening, wherein the first check valve element is movably mounted on a first check valve cylindrical body, wherein the first check valve cylindrical body is axially movable in the central bore, wherein the first check valve cylindrical body is removably positioned in the central bore through the insertion opening, and further including a plug, wherein the plug is releasably engageable in the insertion opening by passage of the plug through the inlet port, wherein the plug includes at least one plug flow passage therethrough, whereby the first check valve cylindrical body and the second check valve cylindrical body are held axially positioned in the central bore axially intermediate of the radially inward extending step surface and the plug.

13. The apparatus according to claim 11
wherein the first check valve element and the second check valve element are installable within the central bore and removable from the central bore by passage of both of the first check value element and the second check valve element through one of the inlet port or the outlet port.

14. Apparatus comprising:
a backflow preventer, including
a body, wherein the body includes
    a central bore, wherein the central bore extends along an axis,
    an inlet port, wherein the inlet port is in fluid connection with the central bore,
    an outlet port, wherein the outlet port is in fluid connection with the central bore,
    a first pressure relief port, wherein the first pressure relief port is in direct fluid connection with the inlet port,
    a second pressure relief port, wherein the second pressure relief port is in direct fluid connection with the central bore fluidly intermediate of a first sealed location and a second sealed location,
    a third pressure relief port, wherein the third pressure relief port is in direct fluid connection with at least one of
        the outlet port, and
        the central bore fluidly intermediate of the second sealed location and the outlet port,
    a first pressure indicating port, wherein the first pressure indicating port is in direct fluid connection with the central bore fluidly intermediate of the first sealed location and the second sealed location,
    a second pressure indicating port, wherein the second pressure indicating port is in direct fluid connection with at least one of
        the outlet port, and
        the central bore fluidly intermediate of the second sealed location and the outlet port, a first check valve element, wherein the first check valve element is removably positioned in the central bore, wherein the first check valve element is axially movable when positioned within the bore between a first check valve element open position and a first check valve element closed position,
    wherein in the first check valve element open position liquid is enabled to flow axially in the central bore in a first axial flow direction past the first check valve element, and
    wherein in the first check valve element closed position liquid is prevented from flowing in the central bore in an opposed flow direction, wherein the opposed flow direction is opposite of the first axial flow direction, a second check valve element, wherein the second check valve element is removably positioned in the central bore, wherein the second check valve element is axially disposed in the bore from the first check valve element, wherein the second check valve element is axially movable when positioned within the bore between a second check valve element open position and a second check valve element closed position,
    wherein in the second check valve element open position liquid is enabled to flow within the central bore in the first axial flow direction past the second check valve element, and
    wherein in the second check valve element closed position liquid is prevented from flowing in the central bore in the opposed flow direction, wherein the first check valve element in the first check valve element closed position prevents fluid flow through the central bore at the first sealed location and wherein the second check valve element in the second check valve element closed position prevents fluid flow through the central bore at the second sealed location, wherein responsive to liquid pressure acting in the first axial flow direction
    the first check valve element is movable from the first check valve element closed position to the first check valve element open position, and
    the second check valve element is movable from the second check valve element closed position to the second check valve element open position.

15. The apparatus according to claim 14 and further comprising:
a first manually operable and closable valve in fluid connection with the first pressure relief port.

16. The apparatus according to claim 15
wherein the central bore comprises a cylindrical bore,
wherein the second check valve element is movably mounted on a second check valve cylindrical body,
    wherein the second check valve cylindrical body includes at least one radially extending back face,
wherein the second check valve cylindrical body is axially movable in the central bore, and
wherein the central bore includes a first axial end, wherein the central bore adjacent the first axial end includes a radially inward extending step surface, wherein the at least one radially extending back face is in operatively abutting engaged relation with the radially inward extending step surface,
wherein the second check valve cylindrical body is axially held in position in the central bore through operative engagement of the at least one back face and the step surface.

17. The apparatus according to claim 16
wherein the first check valve element is movably mounted on a first check valve cylindrical body,
wherein the first check valve cylindrical body is axially movable in the central bore,
wherein the central bore includes a second axial end opposed of the first axial end,
wherein the second axial end includes an insertion opening, wherein the second check valve cylindrical body and the first check valve cylindrical body are removably positioned in the central bore through the insertion opening,
wherein the insertion opening is internally threaded,
and further including a plug, wherein the plug is externally threaded and is releasably threadably engageable in the insertion opening,
wherein the plug includes at least one axially extending plug flow passage,
wherein with the plug engaged in the insertion opening the first cylindrical check valve body in the second cylindrical check valve body are held in respective operative axial positions within the central bore,
wherein with the plug removed from engagement with the insertion opening the first cylindrical check valve body and the second cylindrical check valve body are removable from the central bore through the insertion opening.

18. The apparatus according to claim 17
wherein the body is comprised of a single piece of plastic body material,
wherein, the inlet port comprises a threaded inlet port that extends in the body,
wherein an inlet port overlying surface outwardly radially annularly overlies the inlet port on an outer surface of the body,
and further including a continuous annular inlet reinforcing ring, wherein the inlet reinforcing ring is comprised of a metallic material and extends in surrounding relation of the inlet port overlying surface,
wherein the outlet port comprises a threaded outlet port that extends in the body,
wherein an outlet port overlying surface outwardly radially annularly overlies the outlet port on an outer surface of the body,
and further including a continuous annular outlet reinforcing ring, wherein the outlet reinforcing ring is comprised of the metallic material and extends in surrounding relation of the outlet port overlying surface.

19. The apparatus according to claim 17
wherein the body is comprised of aluminum with a cold sulfuric acid electrolyte produced anodized coating having an aluminum oxide surface coating thickness of from 0.003 to 0.007 inches.

20. The apparatus according to claim 14
and further comprising:
a pressure indicator, wherein the pressure indicator is positioned in fluid connection with the first pressure indicating port,
wherein the pressure indicator includes
a housing,
a movable plunger, wherein the plunger
includes an outer end, and
is movable in operatively supported connection with the housing,
wherein the outer end is biased outward from the housing responsive to fluid pressure in the central bore fluidly intermediate of the first sealed location and the second sealed location.

21. The apparatus according to claim 14
and further comprising:
a pressure indicator, wherein the pressure indicator is positioned in fluid connection with the second pressure indicating port,
wherein the pressure indicator includes
a housing,
a movable plunger, wherein the plunger
includes an outer end, and
is movable in operatively supported connection with the housing,
wherein the outer end is biased outward from the housing responsive to fluid pressure in the central bore fluidly intermediate of the second sealed location and the outlet port.

22. The apparatus according to claim 14
and further comprising:
a pressure indicator, wherein the pressure indicator is positioned in fluid connection with the first pressure indicating port,
wherein the pressure indicator includes
a housing,
wherein the housing includes an outer opening,
a movable plunger, wherein the plunger
extends in the outer opening,
includes an outer end, and
is movable in operatively supported connection with the housing,
wherein the outer end is biased outward from the outer opening responsive to fluid pressure in the central bore intermediate of the first sealed location and the second sealed location.

23. The apparatus according to claim 14
and further comprising:
a visual indicator, wherein the visual indicator is fluidly connected to the central bore intermediate of the first check valve element and the second check valve element,
wherein the visual indicator includes
a housing,
a movable plunger, wherein the plunger
includes an outer end, and
is movable in operatively supported connection with the housing,
wherein the outer end is biased outward from the housing responsive to fluid pressure in the central bore fluidly intermediate of the first check valve element and the second check valve element.

24. The apparatus according to claim 14
and further comprising:
a visual indicator, wherein the visual indicator is fluidly connected to the central bore intermediate of the second check valve element and the outlet port,
wherein the visual indicator includes
a housing,
a movable plunger, wherein the plunger
includes an outer end, and
is movable in operatively supported connection with the housing,
wherein the outer end is biased outward from the housing responsive to fluid pressure in the central bore fluidly intermediate of the second check valve and the outlet port.

25. Apparatus comprising:
a backflow preventer, including
a body,
wherein the body is comprised of a single piece of aluminum with either
an aluminum oxide anodized surface coating or
an unsealed anodized surface,
wherein the body includes
a central bore, wherein the central bore extends along an axis,
an inlet port, wherein the inlet port is axially centered and in fluid connection with the central bore,
an outlet port, wherein the outlet port is axially centered and in fluid connection with the central bore,
a first check valve element, wherein the first check valve element is removably positioned in axially centered relation in the central bore, wherein the first check valve element is axially movable when positioned within the bore between a first check valve element open position and a first check valve element closed position,
wherein in the first check valve element open position liquid is enabled to flow axially in the central bore in a first axial flow direction past the first check valve element, and
wherein in the first check valve element closed position liquid is prevented from flowing in the central bore in an opposed flow direction, wherein the opposed flow direction is opposite of the first axial flow direction,
a second check valve element, wherein the second check valve element is removably positioned in axially centered relation in the central bore, wherein the second check valve element is axially disposed in the bore from the first check valve element,
wherein the second check valve element is axially movable when positioned within the bore between a second check valve element open position and a second check valve element closed position,
wherein in the second check valve element open position liquid is enabled to flow within the central bore in the first axial flow direction past the second check valve element, and
wherein in the second check valve element closed position liquid is prevented from flowing in the central bore in the opposed flow direction,
wherein responsive to liquid pressure acting in the first axial flow direction
the first check valve element is movable from the first check valve element closed position to the first check valve element open position, and
the second check valve element is movable from the second check valve element closed position to the second check valve element open position.

26. Apparatus comprising:
a backflow preventer, including
a body comprised of a single piece of translucent body material, wherein the body includes
a central bore, wherein the central bore extends along an axis,
an inlet port, wherein the inlet port comprises a threaded inlet port that extends in the body and is in fluid connection with the central bore,
wherein an inlet port overlying surface outwardly annularly overlies the inlet port on an outer surface of the body,
an outlet port, wherein the outlet port is in fluid connection with the central bore,
a continuous annular inlet reinforcing ring, wherein the inlet reinforcing ring is comprised of a different material than the body material and extends in surrounding relation of the inlet port overlying surface,
a first check valve element, wherein the first check valve element is removably positioned in the central bore, wherein the first check valve element is axially movable when positioned within the bore between a first check valve element open position and a first check valve element closed position,
wherein in the first check valve element open position liquid is enabled to flow axially in the central bore in a first axial flow direction past the first check valve element, and
wherein in the first check valve element closed position liquid is prevented from flowing in the central bore in an opposed flow direction, wherein the opposed flow direction is opposite of the first axial flow direction,
a second check valve element, wherein the second check valve element is removably positioned in the central bore, wherein the second check valve element is axially disposed in the bore from the first check valve element,
wherein the second check valve element is axially movable when positioned within the bore between a second check valve element open position and a second check valve element closed position,
wherein in the second check valve element open position liquid is enabled to flow within the central bore in the first axial flow direction past the second check valve element, and
wherein in the second check valve element closed position liquid is prevented from flowing in the central bore in the opposed flow direction,
wherein responsive to liquid pressure acting in the first axial flow direction
the first check valve element is movable from the first check valve element closed position to the first check valve element open position, and
the second check valve element is movable from the second check valve element closed position to the second check valve element open position.

27. Apparatus comprising:
a backflow preventer, including
a body comprised of a single piece of transparent material, wherein the body includes
a central bore, wherein the central bore extends along an axis,
an inlet port, wherein the inlet port is in fluid connection with the central bore,
an outlet port, wherein the outlet port comprises a threaded outlet port that extends in the body and is in fluid connection with the central bore,
wherein an outlet port overlying surface outwardly radially annularly overlies the outlet port on an outer surface of the body,
a continuous annular outlet reinforcing ring, wherein the outlet reinforcing ring is comprised of a different material than the body material and extends in surrounding relation of the outlet port overlying surface,
a first check valve element, wherein the first check valve element is removably positioned in the central bore, wherein the first check valve element is axially movable when positioned within the bore between a first check valve element open position and a first check valve element closed position,
wherein in the first check valve element open position liquid is enabled to flow axially in the central bore in a first axial flow direction past the first check valve element, and
wherein in the first check valve element closed position liquid is prevented from flowing in the central bore in an opposed flow direction, wherein the opposed flow direction is opposite of the first axial flow direction,
a second check valve element, wherein the second check valve element is removably positioned in the central bore, wherein the second check valve element is axially disposed in the bore from the first check valve element,
wherein the second check valve element is axially movable when positioned within the bore between a second check valve element open position and a second check valve element closed position,
wherein in the second check valve element open position liquid is enabled to flow within the central bore in the first axial flow direction past the second check valve element, and
wherein in the second check valve element closed position liquid is prevented from flowing in the central bore in the opposed flow direction,
wherein responsive to liquid pressure acting in the first axial flow direction
the first check valve element is movable from the first check valve element closed position to the first check valve element open position, and
the second check valve element is movable from the second check valve element closed position to the second check valve element open position.

28. Apparatus comprising:
a backflow preventer, including
a body comprised of a single piece of body material, wherein the body includes
a central bore, wherein the central bore extends along an axis,
an inlet port, wherein the inlet port comprises a threaded inlet port that extends in the body and is in fluid connection with the central bore,
wherein an inlet port overlying surface radially outwardly annularly overlies the inlet port on an outer surface of the body,
an outlet port, wherein the outlet port comprises a threaded outlet port that extends in the body and is in fluid connection with the central bore,
wherein an outlet port overlying surface radially outwardly annularly overlies the outlet port on the outer surface of the body,
a continuous annular inlet reinforcing ring, wherein the inlet reinforcing ring is comprised of a different material than the body material and extends in surrounding relation of the inlet port overlying surface,
a continuous annular outlet reinforcing ring, wherein the outlet reinforcing ring is comprised of a further different material than the body material and extends in surrounding relation of the outlet port overlying surface,
a first check valve element, wherein the first check valve element is removably positioned in the central bore, wherein the first check valve element is axially movable when positioned within the bore between a first check valve element open position and a first check valve element closed position,
wherein in the first check valve element open position liquid is enabled to flow axially in the central bore in a first axial flow direction past the first check valve element, and
wherein in the first check valve element closed position liquid is prevented from flowing in the central bore in an opposed flow direction, wherein the opposed flow direction is opposite of the first axial flow direction,
a second check valve element, wherein the second check valve element is removably positioned in the central bore, wherein the second check valve element is axially disposed in the bore from the first check valve element,
wherein the second check valve element is axially movable when positioned within the bore between a second check valve element open position and a second check valve element closed position,
wherein in the second check valve element open position liquid is enabled to flow within the central bore in the first axial flow direction past the second check valve element, and
wherein in the second check valve element closed position liquid is prevented from flowing in the central bore in the opposed flow direction,
wherein responsive to liquid pressure acting in the first axial flow direction
the first check valve element is movable from the first check valve element closed position to the first check valve element open position, and
the second check valve element is movable from the second check valve element closed position to the second check valve element open position.

29. The apparatus according to claim 28
wherein the body is comprised of a single piece of plastic material,
wherein the inlet reinforcing ring is comprised of a metallic material and extends in surrounding relation of the inlet port overlying surface,
wherein the outlet reinforcing ring is comprised of the metallic material and extends in surrounding relation of the outlet port overlying surface.

30. The apparatus according to claim 28 wherein the different material and the further different material comprise the same material.

31. Apparatus comprising:
a backflow preventer, including
a body, wherein the body includes
a central bore, wherein the central bore extends along an axis,
an inlet port, wherein the inlet port is axially centered and in fluid connection with the central bore,
an outlet port, wherein the outlet port is axially centered and in fluid connection with the central bore,
a first pressure relief port, wherein the first pressure relief port is in direct liquid connection with the inlet port,
a second pressure relief port,
a third pressure relief port,
a first check valve element, wherein the first check valve element is removably positioned in axially centered relation in the central bore, wherein the first check valve element is axially movable when positioned within the bore between a first check valve element open position and a first check valve element closed position, wherein in the first check valve element open position liquid is enabled to flow axially in the central bore in a first axial flow direction past the first check valve element, and wherein in the first check valve element closed position liquid is prevented from flowing in the central bore in an opposed flow direction at a first sealed location, wherein the opposed flow direction is opposite of the first axial flow direction, a second check valve element, wherein the second check valve element is removably positioned in axially centered relation in the central bore, wherein the second check valve element is axially disposed in the bore from the first check valve element, wherein the second check valve element is axially movable when positioned within the bore between a second check valve element open position and a second check valve element closed position, wherein in the second check valve element open position liquid is enabled to flow within the central bore in the first axial flow direction past the second check valve element, and wherein in the second check valve element closed position liquid is prevented from flowing in the central bore in the opposed flow direction at a second sealed location, wherein the second pressure relief port is in direct liquid connection with the central bore fluidly intermediate of the first sealed location and the second sealed location, wherein the third pressure relief port is in direct liquid connection with at least one of
the outlet port, and
the central bore fluidly intermediate of the second sealed location and the outlet port, wherein responsive to liquid pressure acting in the first axial flow direction
the first check valve element is movable from the first check valve element closed position to the first check valve element open position, and
the second check valve element is movable from the second check valve element closed position to the second check valve element open position.

32. Apparatus comprising:
a backflow preventer, including
a body, wherein the body includes
a central bore, wherein the central bore comprises a cylindrical bore that extends along an axis,
an inlet port, wherein the inlet port is axially centered and in fluid connection with the central bore,
an outlet port, wherein the outlet port is axially centered and in fluid connection with the central bore,
a first check valve element, wherein the first check valve element is removably positioned in axially centered relation in the central bore, wherein the first check valve element is axially movable when positioned within the bore between a first check valve element open position and a first check valve element closed position,
wherein in the first check valve element open position liquid is enabled to flow axially in the central bore in a first axial flow direction past the first check valve element, and
wherein in the first check valve element closed position liquid is prevented from flowing in the central bore in an opposed flow direction, wherein the opposed flow direction is opposite of the first axial flow direction, a second check valve element, wherein the second check valve element is movably mounted on a second check valve cylindrical body that includes at least one radially extending back face, wherein the second element check valve is removably positioned in axially centered relation in the central bore, wherein the second check valve element is axially disposed in the bore from the first check valve element, wherein the second check valve cylindrical body is axially movable in the central bore, wherein the second check valve element is axially movable when positioned within the bore between a second check valve element open position and a second check valve element closed position, wherein in the second check valve element open position liquid is enabled to flow within the central bore in the first axial flow direction past the second check valve element, and wherein in the second check valve element closed position liquid is prevented from flowing in the central bore in the opposed flow direction, wherein the central bore includes a first axial end, wherein the central bore adjacent the first axial end includes a radially inward extending step surface, wherein the at least one radially extending back face is in abutting operatively engaged relation with the radially inward extending step surface, wherein the second check valve cylindrical body is axially held in position in the central bore through operative engagement of the at least one back face and the step surface, wherein the central bore includes a second axial end axially opposed of the first axial end, wherein the second axial end includes an insertion opening, wherein the second check valve cylindrical body is removably positioned in the central bore through the insertion opening, wherein the first check valve element is movably mounted on a first check valve cylindrical body, wherein the first check valve cylindrical body is axially movable in the central bore, wherein the first check valve cylindrical body is removably positioned in the central bore through the insertion opening, and further including a spacer, wherein the spacer is positioned in the central bore axially intermediate of the first check valve cylindrical body and the second check valve cylindrical body, wherein the spacer is axially movable in the central bore and is removably positioned in the central bore through the insertion opening, wherein responsive to liquid pressure acting in the first axial flow direction
the first check valve element is movable from the first check valve element closed position to the first check valve element open position, and
the second check valve element is movable from the second check valve element closed position to the second check valve element open position.

33. The apparatus according to claim 32
and further including a plug,
wherein the plug is releasably engageable in the insertion opening, wherein the plug includes at least one plug flow passage therethrough, whereby the first check valve cylindrical body, the spacer and the second check valve cylindrical body are held in the central bore axially intermediate of the radially inward extending step surface and the plug.

34. The apparatus according to claim 32
wherein the insertion opening is internally threaded,
and further including a plug,
wherein the plug is externally threaded and is releasably threadably engaged in the insertion opening,
wherein the plug includes a central plug flow passage therethrough,
wherein the central plug flow passage is configured to receive therein a rotatable tool, whereby the plug is rotatably engaged in and disengageable from the insertion opening through rotational movement of the tool in engagement in the plug flow passage,
whereby the first check valve cylindrical body, the spacer and the second check valve cylindrical body are held in the central bore axially intermediate of the radially inward extending step surface and the plug, and are removable from the central bore through the insertion opening when the plug is disengaged from the insertion opening.

35. The apparatus according to claim 32
wherein the insertion opening is internally threaded,
and further including a plug,
wherein the plug is externally threaded and is releasably threadably engageable in the insertion opening,
wherein the plug includes a central plug flow passage therethrough,
wherein the central plug flow passage is configured to receive therein a rotatable tool, whereby the plug is rotatably engageable and disengageable in the insertion opening through rotational movement of the tool in engagement in the plug flow passage,
wherein when the plug is engaged in the insertion opening, the rotatable tool is engageable in the central plug flow passage through one of either the inlet port or the outlet port,
whereby the first check valve cylindrical body, the spacer and the second check valve cylindrical body are held in the central bore axially intermediate of the radially inward extending step surface and the plug, and are removable from the central bore through the insertion opening when the plug is disengaged from the insertion opening.

36. The apparatus according to claim 32
wherein the insertion opening is internally threaded,
and further including a plug,
wherein the plug is externally threaded and is releasably threadably engageable in the insertion opening,
wherein the plug includes a central plug flow passage therethrough,
wherein the central plug flow passage is configured to receive therein a rotatable tool,
whereby the plug is rotatably engageable in and rotatably disengageable from the insertion opening through rotational movement of the tool in engagement in the plug flow passage,
wherein when the plug is engaged in the insertion opening, the rotatable tool is engageable in the central plug flow passage through the inlet port, and wherein the plug is removable from the insertion opening through the inlet port, whereby the first check valve cylindrical body, the spacer and the second check valve cylindrical body are held in the central bore axially intermediate of the radially inward extending step surface and the plug, and are removable from the central bore through the inlet port when the plug is disengaged from the insertion opening.

37. The apparatus according to claim 32
wherein a central bore access opening extends in axially centered relation through the step surface, wherein the central bore access opening is accessible from outside the body through the outlet port,
wherein the insertion opening is internally threaded,
and further including a plug,
wherein the plug is externally threaded and is releasably threadably engageable in the insertion opening,
wherein the plug includes an axially central plug flow passage therethrough, wherein liquid that enters the inlet port passes through the flow passage to reach the first check valve element,
wherein when the plug is engaged in the insertion opening, a rotatable tool is engageable in the central plug flow passage through one of either the inlet port or the outlet port,
wherein the first check valve cylindrical body, the spacer and the second check valve cylindrical body are held in the central bore axially intermediate of the radially inward extending step surface and the plug, and are removable from the central bore through the insertion opening and the inlet port when the plug is disengaged from the insertion opening, whereby an item can be extended through the outlet port and the central bore access opening to push the first check valve cylindrical body, the spacer and the second check valve cylindrical body out of the central bore through the insertion opening and the inlet port.

38. The apparatus according to claim 32
wherein a central bore access opening extends in axially centered relation through the step surface, wherein the central bore access opening is accessible from outside the body through the outlet port,
wherein the insertion opening is internally threaded,
and further including a plug,
wherein the plug is externally threaded and is releasably threadably engageable in the insertion opening,
wherein the plug includes a central plug flow passage therethrough,
wherein when the plug is engaged in the insertion opening, a tool that is configured to engage and rotate the central plug is extendable to engage the plug through one of either the inlet port or the outlet port,
wherein the first check valve cylindrical body and the second check valve cylindrical body are held in the central bore axially intermediate of the radially inward extending step surface and the plug, and are removable from the central bore through the insertion opening and the inlet port when the plug is disengaged from the insertion opening, wherein the first check valve cylindrical body and the second check valve cylindrical body are enabled to be operatively engaged through the central bore access opening and the outlet port, and pushed out of the cylindrical bore through the insertion opening and the inlet port.

* * * * *